United States Patent [19]
Dwyer et al.

[11] Patent Number: 5,990,640
[45] Date of Patent: *Nov. 23, 1999

[54] MOTOR CONTROL APPARATUS

[75] Inventors: Patrick H. Dwyer, Penn Valley; Leland M. Farrer, Morgan Hill; Martin Mason, San Jose, all of Calif.

[73] Assignee: Aim Controls, Inc., Penn Valley, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/625,002

[22] Filed: Mar. 29, 1996

[51] Int. Cl.[6] .............................. H02P 7/00; H02K 29/00
[52] U.S. Cl. ...................... 318/254; 318/138; 318/439; 318/245
[58] Field of Search ....................... 323/235, 239; 361/173, 85; 318/254, 138, 812, 788, 245, 800, 439, 778, 798; 364/550; 388/821, 820, 815

[56] References Cited

U.S. PATENT DOCUMENTS

| | | | |
|---|---|---|---|
| 3,716,771 | 2/1973 | Maynard | 388/821 |
| 3,766,409 | 10/1973 | Shuey . | |
| 4,297,628 | 10/1981 | Hedges | 318/812 |
| 4,408,149 | 10/1983 | Collins et al. . | |
| 4,528,485 | 7/1985 | Boyd, Jr. | 318/138 |
| 4,833,628 | 5/1989 | Curran, Jr. | 318/800 |
| 4,870,340 | 9/1989 | Kral | 323/235 |
| 4,908,561 | 3/1990 | Hashimoto . | |
| 4,928,049 | 5/1990 | Pietrobon et al. . | |
| 5,015,937 | 5/1991 | Wright et al. . | |
| 5,061,888 | 10/1991 | Hiraoka . | |
| 5,216,345 | 6/1993 | Eyerly . | |
| 5,366,303 | 11/1994 | Barrus et al. | 400/234 |

FOREIGN PATENT DOCUMENTS

| | | |
|---|---|---|
| 0 196 543 | 10/1986 | European Pat. Off. . |
| 02133094 | 5/1990 | European Pat. Off. . |
| 08019295 | 1/1996 | European Pat. Off. . |

OTHER PUBLICATIONS

Trescott, "All Digital Circuit Fires Triacs", EDN Jul. 21, 1994.

*Primary Examiner*—Paul Ip
*Attorney, Agent, or Firm*—John P. O'Banion

[57] ABSTRACT

An H-Bridge motor controller having a floating, electrically isolated high side FET driver design where the motor driver circuity is electrically isolated from the logic circuitry. Back EMF generation during motor operation is minimized by employing a "fifth" power transistor to the H-Bridge that connects the motor coil to ground when the other transistors in the H-Bridge are turned off, so as to provide a direct path for the unused energy to be removed from the driver circuit without interfering with the normal switching of the FETs. Alternatively, back EMF generation is minimized by applying switching signals to the H-Bridge where, instead of turning the low side FET drivers between motor clocks, the low side FET drivers are both turned on during the "off time" period, so as to connect both ends of the motor coil to ground during the "off" period, thereby draining the coil of unused energy. The fifth power transistor also permits either one-half or the entire motor coil to be connected to the H-Bridge at the commencement of the energizing phase, thereby altering the inductive load seen by the H-Bridge upon motor energization. The motor controller also includes analog and digital circuits that automatically vary the voltage and/or current applied to the motor depending upon performance characteristics such as speed, electromagnetic characteristics and torque load.

21 Claims, 24 Drawing Sheets

| | MTR CLK PULSE | OFF TIME | MTR CLK PULSE | OFF TIME | MTR CLK PULSE | OFF TIME | MTR CLK PULSE | OFF TIME |
|---|---|---|---|---|---|---|---|---|
| UPPER LEFT | 1 | 0 | 0 | 0 | 0 | 0 | 0 | 0 |
| LOWER RIGHT | 1 | 0 | 0 | 0 | 0 | 0 | 0 | 0 |
| UPPER RIGHT | 0 | 0 | 1 | 1 | 1 | 0 | 0 | 0 |
| LOWER LEFT | 0 | 0 | 1 | 0 | 0 | 0 | 1 | 0 |
| BACK EMF | 0 | 1 | 0 | 1 | 0 | 1 | 0 | 1 |

| | MTR CLK PULSE | OFF TIME | MTR CLK PULSE | OFF TIME | MTR CLK PULSE | OFF TIME | MTR CLK PULSE | OFF TIME |
|---|---|---|---|---|---|---|---|---|
| UPPER LEFT | 1 | 0 | 0 | 0 | 1 | 0 | 0 | 0 |
| LOWER RIGHT | 1 | 1 | 0 | 1 | 1 | 1 | 0 | 1 |
| UPPER RIGHT | 0 | 0 | 1 | 0 | 0 | 0 | 1 | 0 |
| LOWER LEFT | 0 | 1 | 1 | 1 | 0 | 1 | 1 | 1 |

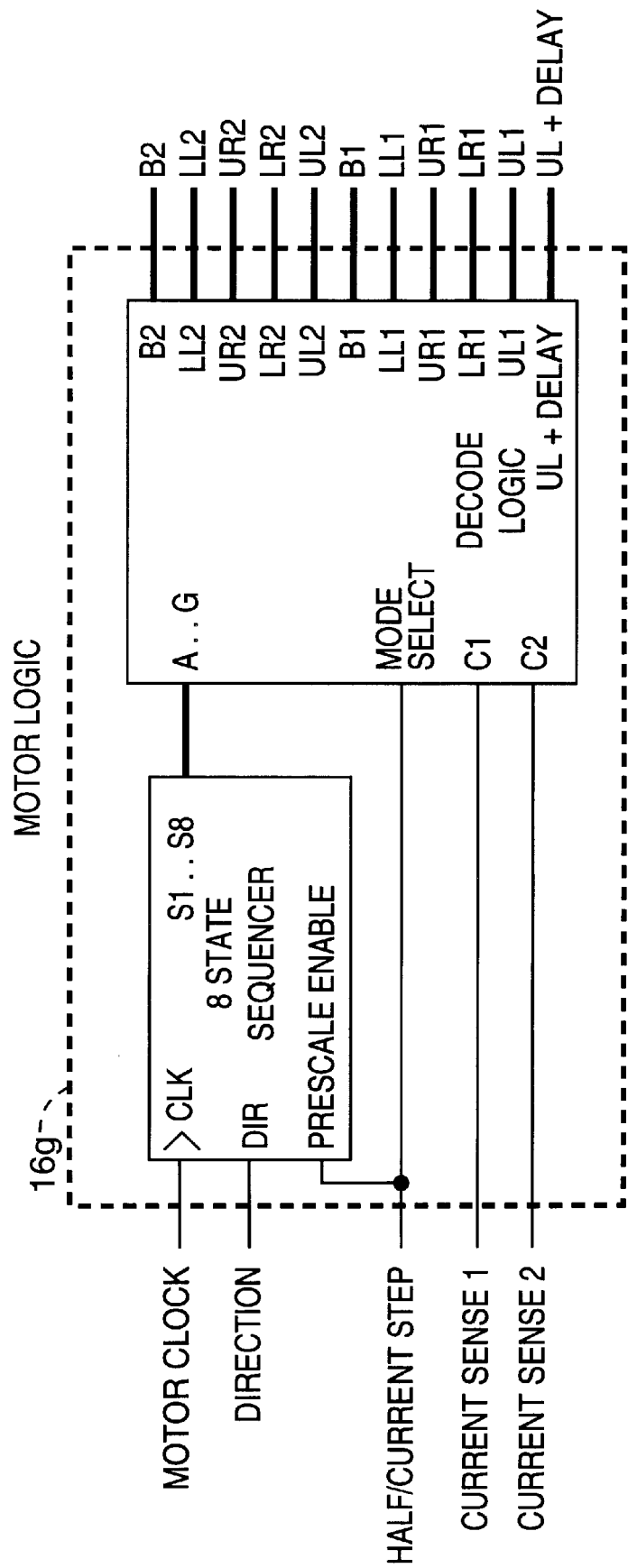
FIG. — 17

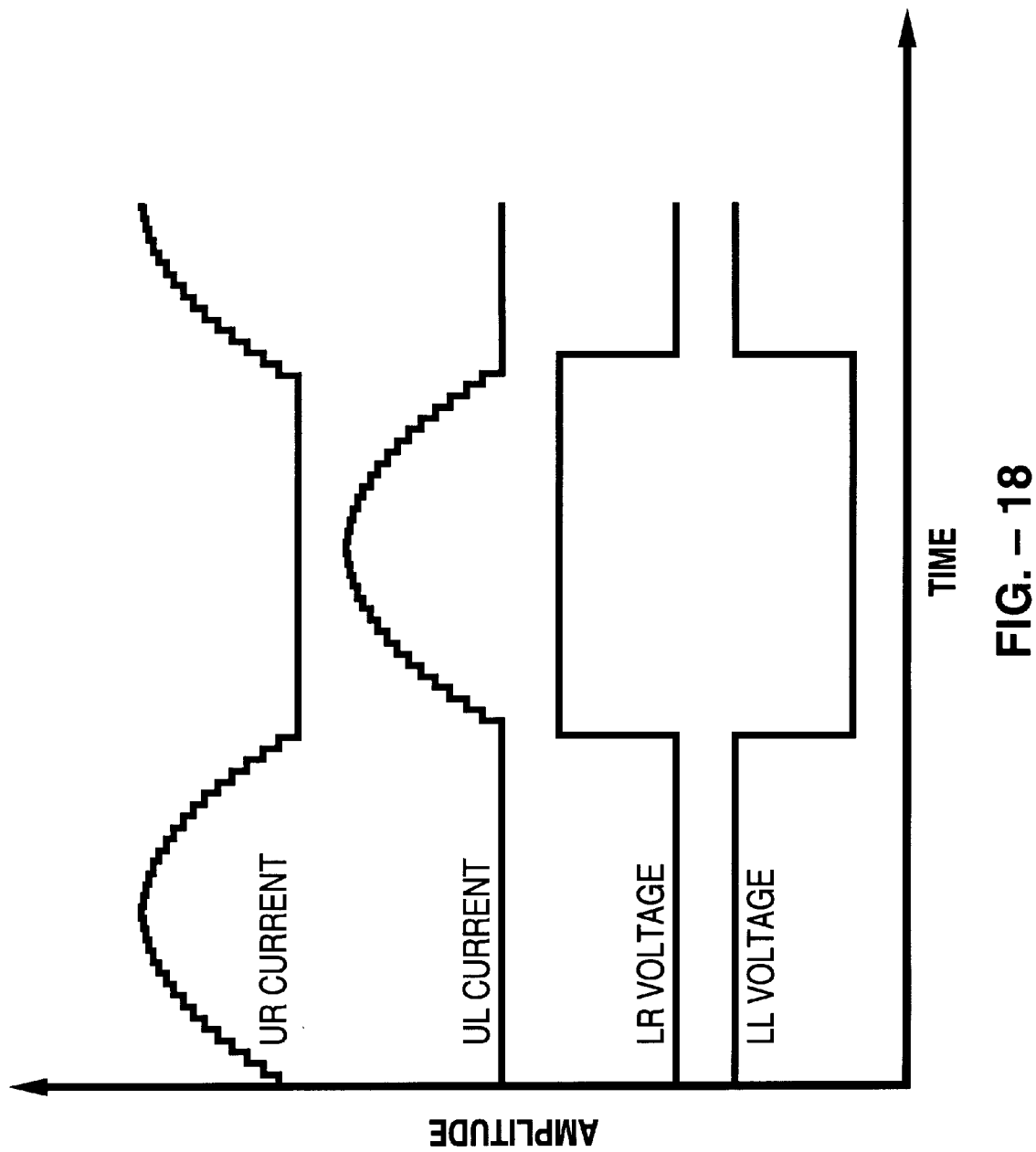

MOTOR CONTROL APPARATUS

BACKGROUND OF THE INVENTION

1. Field of the Invention

This invention pertains generally to devices for controlling speed, direction, and torque of motors, and more particularly to H-Bridge type motor controllers which are commonly used to control stepping motors.

2. Description of the Background Art

H-Bridge type motor drivers are commonly used to control the speed, direction, and torque of stepping motors. Conventional H-Bridge type motor drivers, however, exhibit a number of operational limitations such as (i) limitations on the motor driving voltage, thereby restricting very high speed operation, (ii) a narrow range of frequency over which the power driver circuit can operate, (iii) noise transferring from the power switching circuit (H-Bridge) into the motor driver logic circuitry, and (iv) susceptibility of the motor driver logic circuitry to damage in the event of failure of the power circuit.

Further, conventional H-Bridge type drivers typically utilize a power supply which powers both the H-Bridge circuity and the digital control circuitry. When the electrical power applied to the motor coil by a conventional H-Bridge controller is turned off, the magnetic field in the motor collapses and the unused energy, along with the additional energy from the motor acting as an electrical generator, flows back into the field effect transistors (FET) which are typically used to form the H-Bridge. This energy can be quite large and can damage or destroy the high side FETs. As a result, most FET manufacturers incorporate protection diodes into FETs used for driving inductive loads like motors and relays. However, while these diodes prevent failure of the FETs, they have only limited success in dissipating the excess energy. In practice, significant energy leaks over to the gate of the high side FETs and ends up interfering with the gate driving signal. As a consequence, the FETs end up being switched "on" when they should be "off", thereby causing the motor to operate less efficiently, and ultimately to prematurely stall.

Also, a common practice with conventional H-Bridge motor drivers is to use a technique called current chopping whereby the logic "on time" for each leg of the H-Bridge is limited to that necessary to raise the current level in the motor coil to a desired level. This technique involves applying a fixed voltage to the motor and then monitoring the current developed across a sensing resistor connected between the sources of the low side FETs and ground. When the current rises to the desired level, the logic circuit turns off the FET driver signals. However, while current chopping is a very useful technique, it does not alleviate two of the most serious problems encountered in switching inductive motor loads. First, it does nothing about the energy from the collapsing magnetic fields flowing back into the H-Bridge FETs. Second, it does not solve the problem of trying to match the amount of driving voltage to the motor armature characteristics at a given speed.

It is well known that, in order to make stepping motors (and other motors as well) turn at faster speeds, it is necessary to apply greater amounts of electromotive force (voltage) to overcome the increasing inductive reactance of the motor armature. Generally, the higher the voltage, the higher the possible motor speed. However, when a fixed high voltage is applied to obtain a very high speed, the motor's low speed operation is degraded by increased vibration and noise and, in the case of stepping motors, by increased likelihood of missed steps.

Additionally, the inductance of the motor and the electrical pathway between the FETs and the motor causes a voltage spike upon turn on of the circuit. This spike increases dramatically as the voltage exceeds that needed for a given speed and work load. If the spike gets too large, it can lead to failure of the FETs. In conventional controllers, this voltage spike is typically treated symptomatically; either a snubber (consisting of a low value resistor and capacitor in series) is placed across the motor coil, or a fast switching diode is placed across the FET. The snubber acts to slow the rise time of the spike, while the fast switching diodes route the spike around the FET.

SUMMARY OF THE INVENTION

The foregoing deficiencies, as well as others, are overcome by the H-Bridge motor controller of the present invention. In general, the present invention provides seven principal benefits: first, it permits the real time control of the voltage applied to the motor so that the voltage applied to the motor can be adjusted to better match the motor's electromagnetic characteristics and torque load at a given speed; second, it results in a substantial increase in the dynamic frequency range in which the H-Bridge power circuit can operate in; third, it permits the real time control of the current applied to the motor so it can be adjusted to better match the motor's electromagnetic characteristics and torque load at a given speed; fourth, it substantially reduces the effects of back EMF and excess unused energy on the H-Bridge switching circuit; fifth, it isolates the motor driver high voltage circuit from the logic circuitry, thereby reducing transfer of noise from the power switching circuit (H-Bridge) into the motor driver logic circuitry; sixth, it isolates the motor driver logic circuitry from electrical damage in the event of a failure of the power circuit; and seventh, it permits either one-half or the entire motor coil to be connected to the H-Bridge circuit at "turn on time", which alters the inductive load at "turn on time", thereby substantially increasing the high end frequency range of the motor.

By way of example, and not of limitation, the motor control apparatus of the present invention employs a floating, electrically isolated high side FET driver design wherein the motor driver circuity is electrically isolated from the logic circuitry. Further, back EMF generation is minimized by employing a "fifth" power transistor to the H-Bridge that connects the motor coil (generally through an unused center tap on the motor coil) to ground when the other transistors in the H-Bridge are turned off, so as to provide a direct path for the unused energy to be removed from the driver circuit without interfering with the normal switching of the FETs. Alternatively, back EMF generation is minimized by applying switching signals to the H-Bridge where, instead of turning the bottom FETs of the bridge off between motor clocks (i.e., before reversing direction), the bottom FETs are both turned on during the "off time" period, so as to connect both ends of the motor coil to ground during the "off" period, thereby draining the coil of unused energy. Further, both of the techniques can be combined.

In addition, the present invention employs analog and digital circuits that automatically vary the voltage applied to the motor depending upon the motor switching speed. The analog circuitry operates by means of a pulse modulated (PM) waveform that is synchronized with the 120 Hz half wave DC voltage being controlled by a triac, whereas the digital circuitry employs one or more counters, also synchronized with the 120 Hz half wave, that can be programmed at fixed values or that can be programmed in real time by a microprocessor and which create a PM firing signal for control of a triac.

An object of the invention is to permit a motor to be driven at any desired voltage so that very high speed operation can be achieved.

Another object of the invention is to permit a motor to be driven at any desired current to optimize operation over the entire dynamic frequency range.

Another object of the invention is to increase the dynamic frequency range over which a motor can be operated with a single controller.

Another object of the invention is to provide a motor controller wherein the motor driver high voltage circuitry is electrically isolated from the logic circuitry.

Another object of the invention is to provide a motor controller with reduced noise transfer from the power switching circuit into the logic circuitry.

Another object of the invention is to provide a motor controller wherein the motor driver logic circuitry is protected from electrical damage in the event of a failure of the power switching circuitry.

Another object of the invention is to reduce and/or to effectively dissipate the amount of back EMF generated by a motor.

Another object of the invention is to provide a motor controller wherein power losses and heat dissipation in the motor driver circuitry is reduced.

Another object of the invention is to provide a motor controller which can operate motors over a wide range of speeds.

Another object of the invention is to provide a motor controller wherein the inductive load seen by the H-Bridge circuit at "turn on time" is reduced for a short period of time, thereby substantially increasing the motor's maximum operating frequency.

Another object of the invention is to provide a motor controller wherein drive voltage to the motor can be controlled as a function of motor performance characteristics such as motor speed, electromagnetic characteristics and torque load.

Further objects and advantages of the invention will be brought out in the following portions of the specification, wherein the detailed description is for the purpose of fully disclosing preferred embodiments of the invention without placing limitations thereon.

BRIEF DESCRIPTION OF THE DRAWINGS

The invention will be more fully understood by reference to the following drawings which are for illustrative purposes only:

FIG. 17 is a functional block diagram of the motor logic element of the digital motor controller shown in FIG. 12.

FIG. 18 is a typical phase diagram for the current timer shown in FIG. 14.

DESCRIPTION OF THE PREFERRED EMBODIMENTS

Referring more specifically to the drawings, for illustrative purposes the present invention is embodied in the apparatus generally shown in FIG. 1 through FIG. 17. It will be appreciated that the apparatus may vary as to configuration and as to details of the parts without departing from the basic concepts as disclosed herein.

1. Floating, Isolated High Side FET Driver

Figure 1:
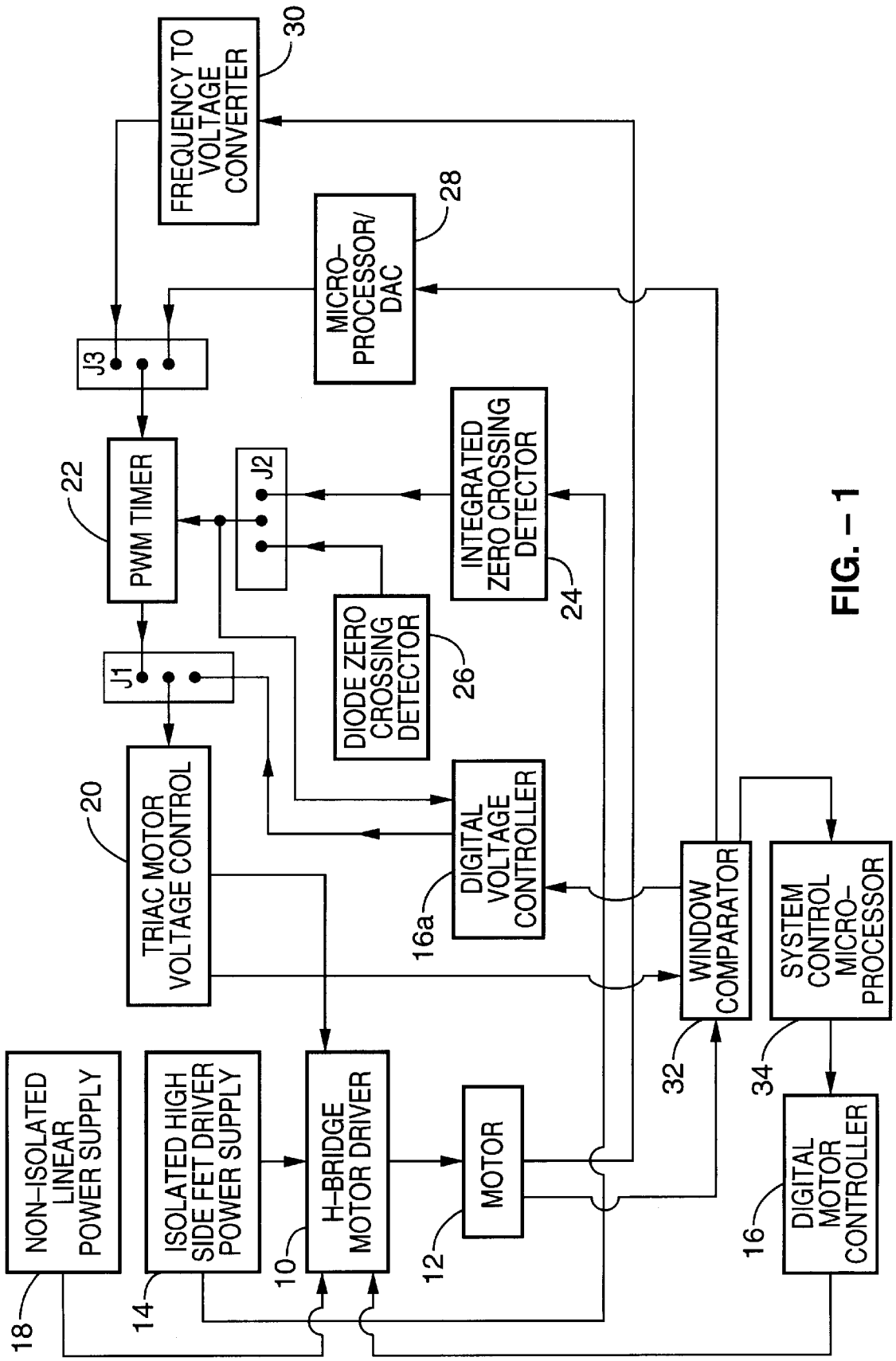
FIG. 1 is a functional block diagram of a motor control apparatus in accordance with the present invention.
Figure 2A:
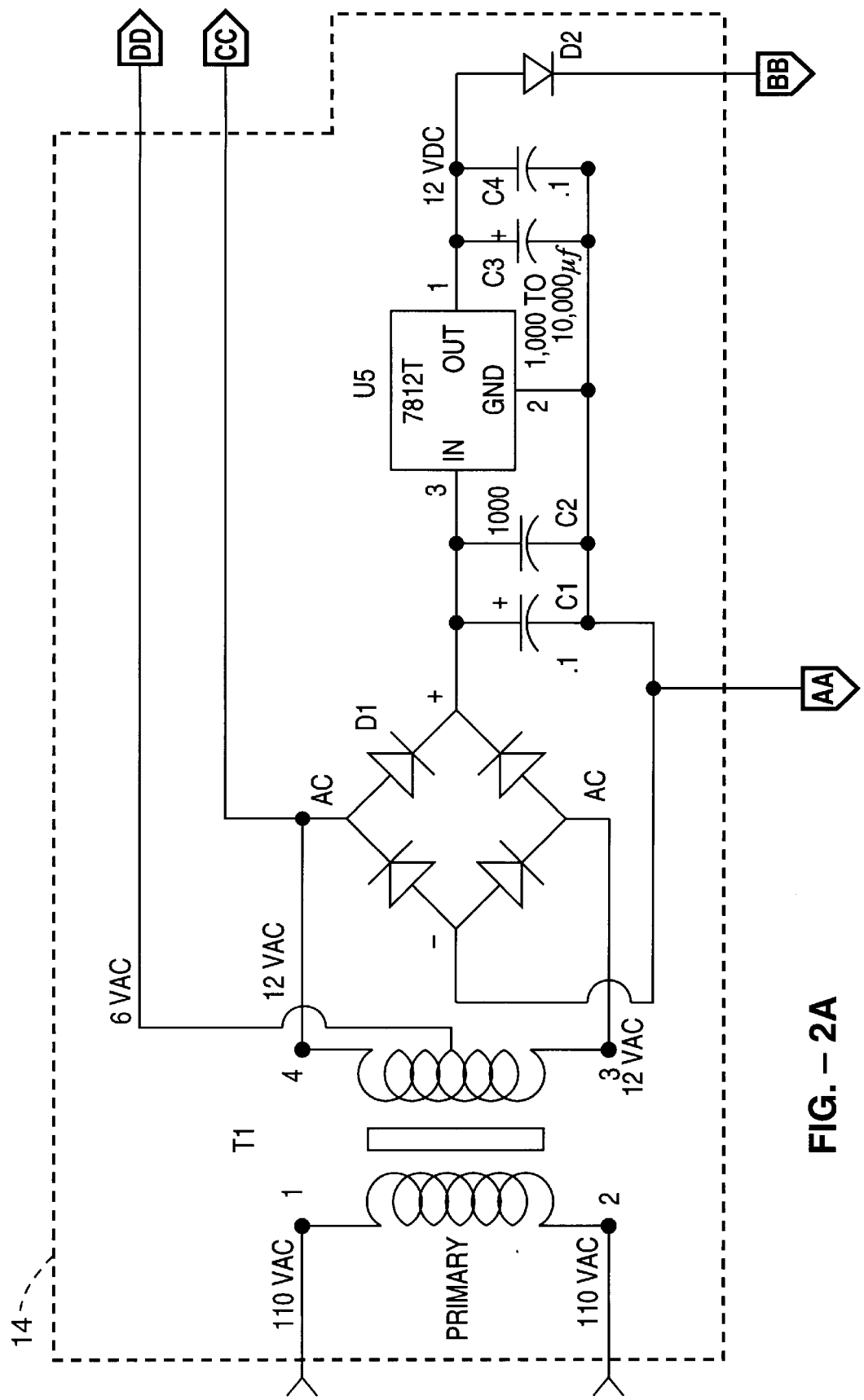
FIG. 2A through FIG. 2L is a schematic diagram of an embodiment of the motor control apparatus shown in FIG. 1.
Figure 2B:
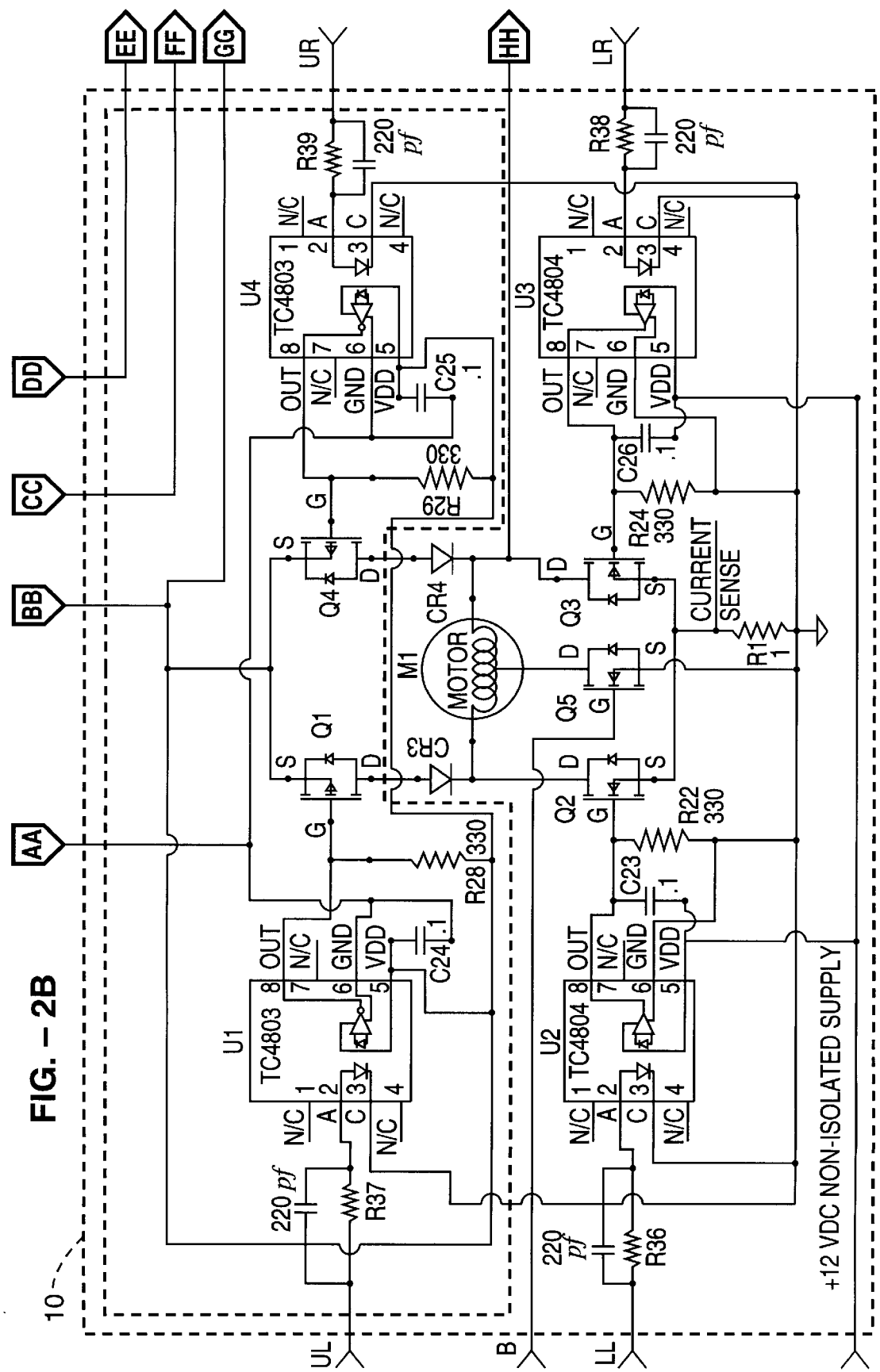

Referring first to FIG. 1, FIG. 2A and FIG. 2B, a motor control apparatus in accordance with the present invention is generally shown. As can be seen, the apparatus is based upon an H-Bridge motor driver 10, having a unique floating, isolated high side field effect transistor (FET) driver design that generally comprises two circuit elements. The first is a 12-volt direct current (DC) high side FET driver power supply 14, and the second are a pair of opto-isolated FET drivers U1 and U4.

Power supply 14 is of a standard linear regulator design. The secondary winding of an alternating current transformer T1, which is sufficient to yield 12-volts DC from a full wave bridge rectifier at approximately 100 milliamperes RMS (1.5 amps peak), is fed into a full wave bridge rectifier D1. The rectified full wave DC is then fed into a standard 7812 or like three terminal linear regulator U5. Regulator U5 has a 1000 uf electrolytic capacitor and a 0.1 uf bypass capacitor across its input to support the current demand on the regulator and to minimize noise and oscillation. Similarly, the output of regulator U5 is filtered by a 10 $\mu f$ capacitor, which is typically a dipped tantalum type along with a standard 0.1 $\mu f$ bypass capacitor. The diode D2 in series with the output of regulator U5 is merely a precautionary device to protect against any accidental connection of the high voltage motor supply from the triac circuit, and may be omitted if desired. The critical element is that the 12-volt DC output of power supply 14 remain isolated by keeping the negative DC return separate from all ground potentials that may exist in the overall circuit such as the ground for the digital logic supply or the ground for the high voltage motor supply.

Figure 2C:
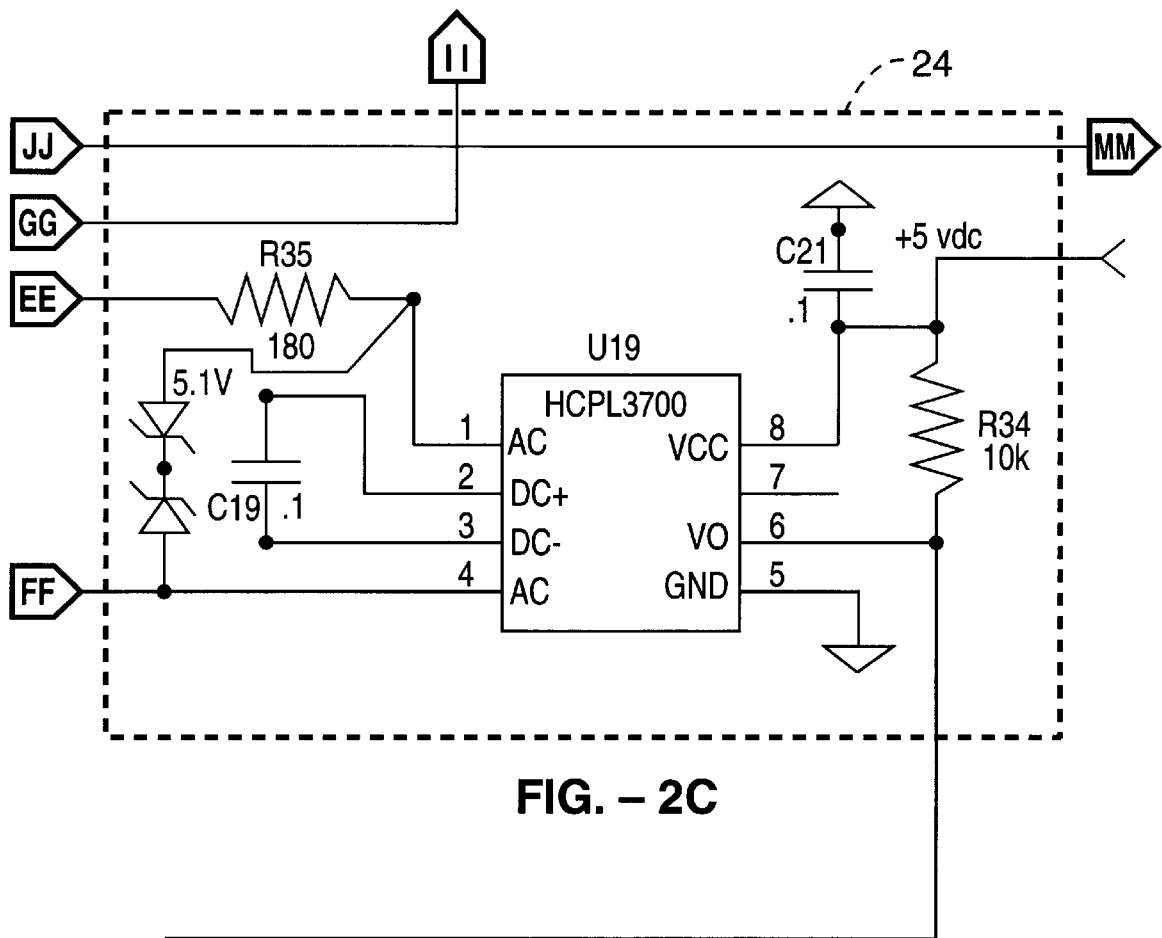
Figure 2D:
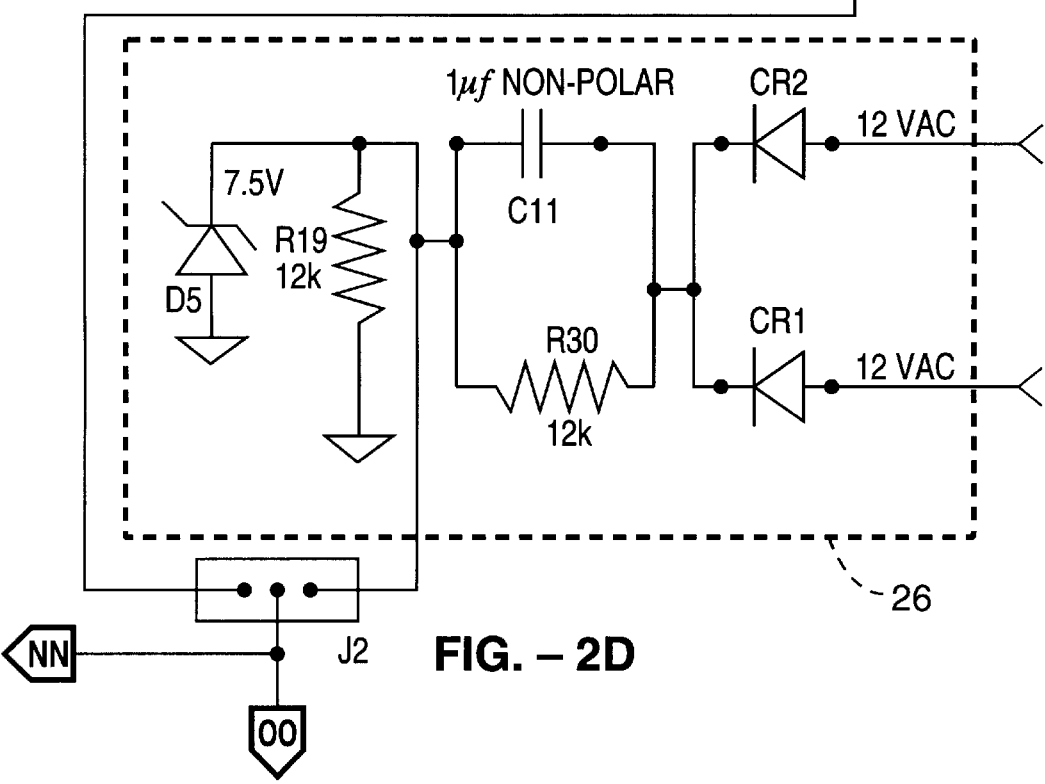
Figure 2E:
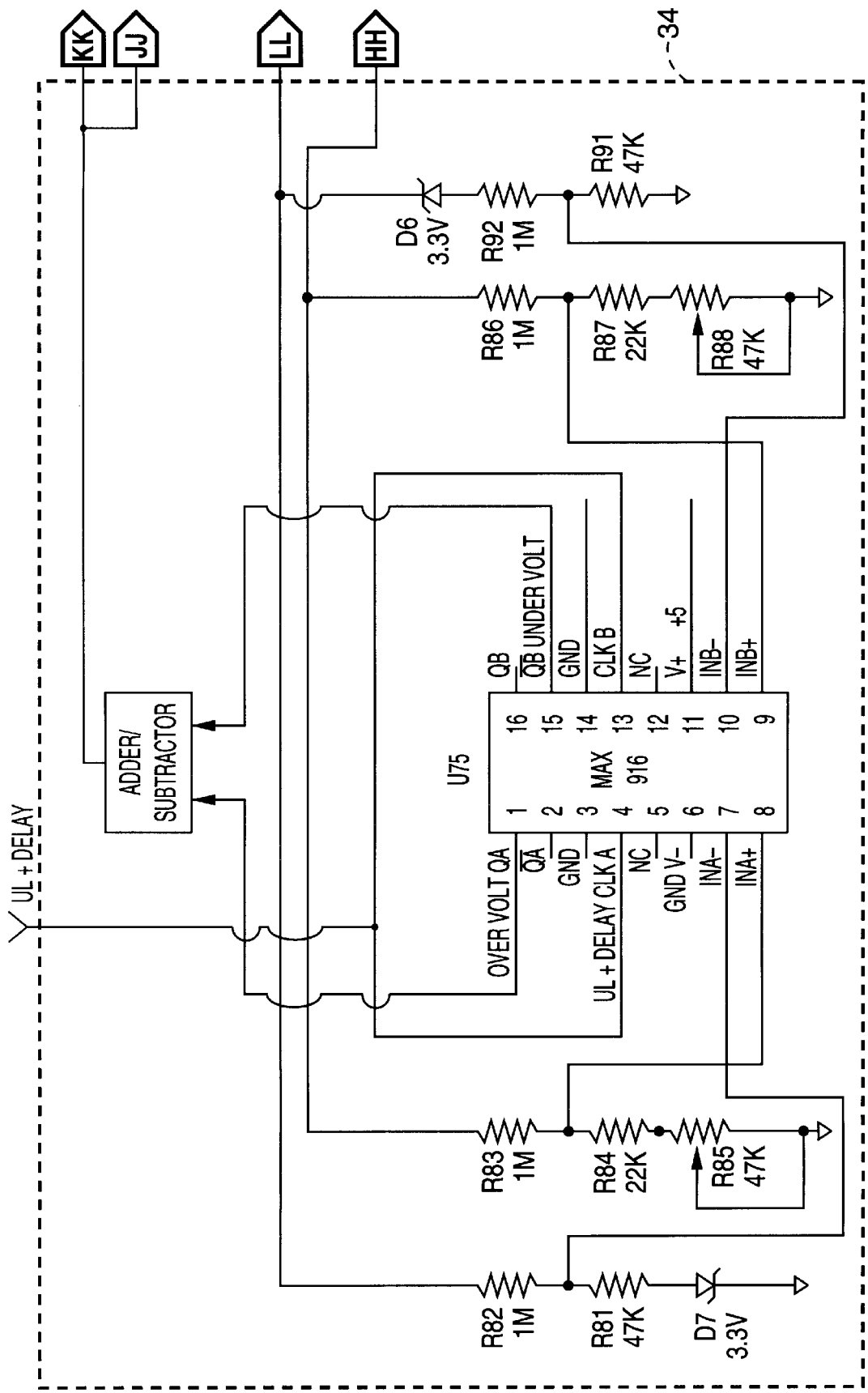
Figure 2F:
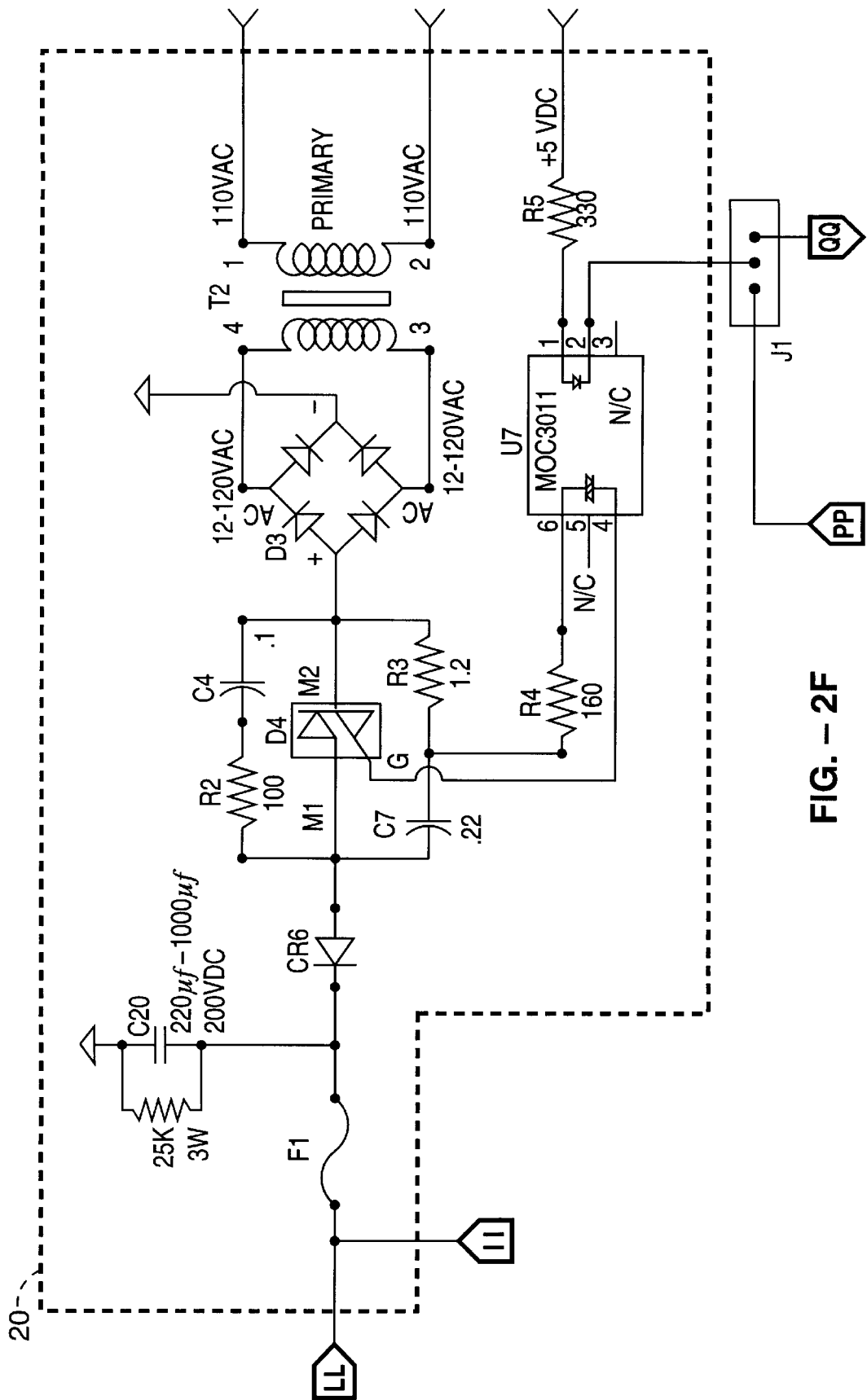
Figure 2G:
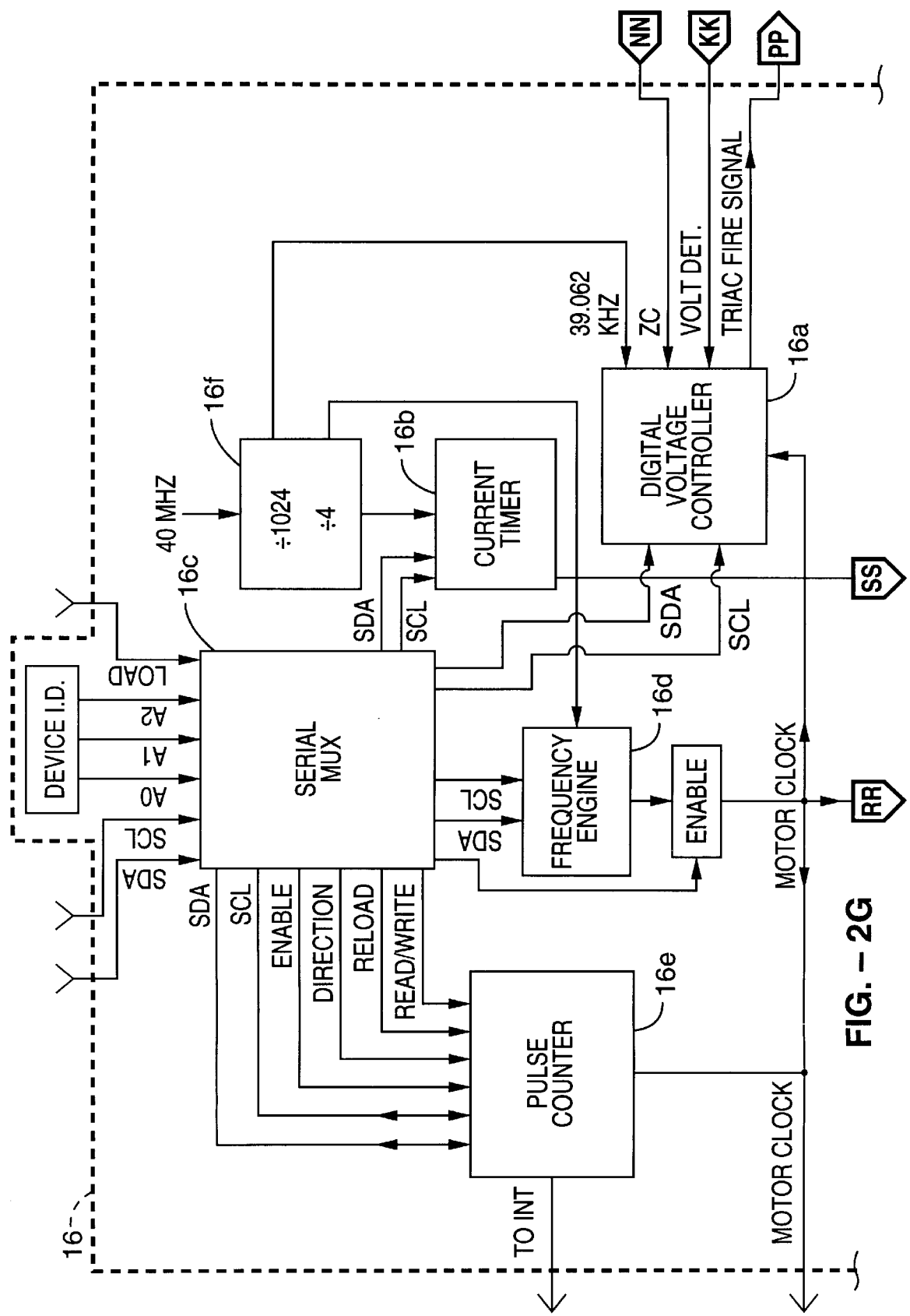
Figure 2H:
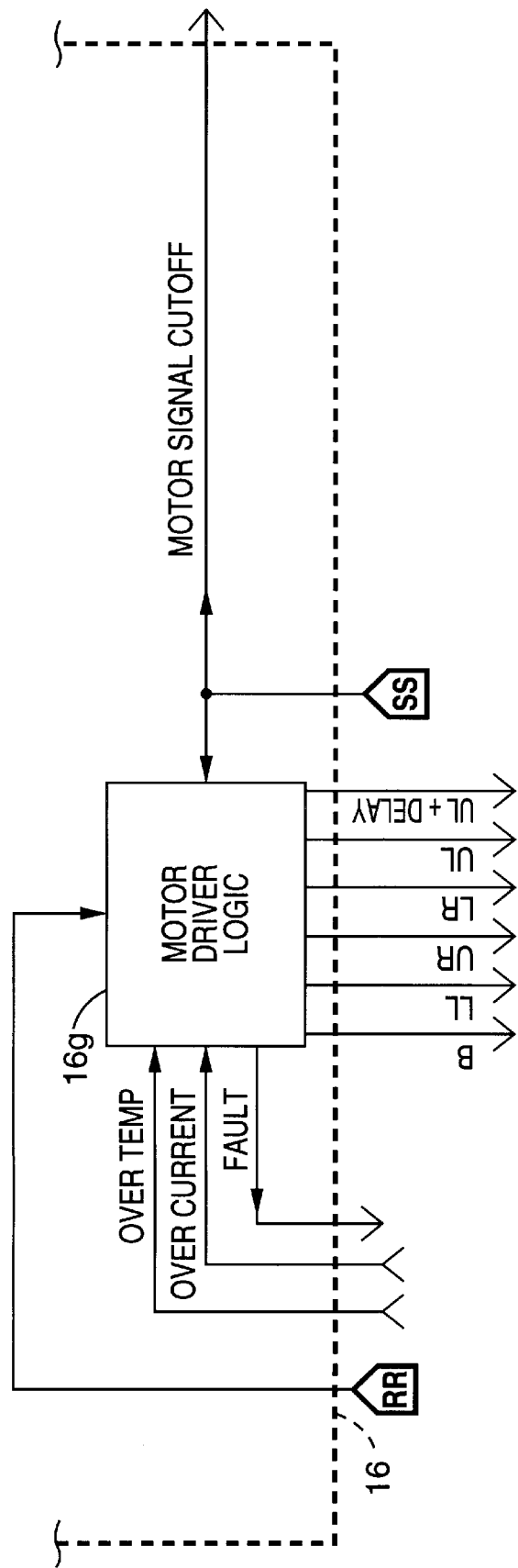

The opto-isolated high side FET drivers, U2 and U4, are preferably Telecom Semiconductor TC4803 devices or the like which accept logic levels from digital motor controller 16 which is shown in more detail in FIG. 2G and FIG. 2H. Those skilled in the art will appreciate that other similar parts may exist and be substituted provided that the desired switching speeds, current output and other parameters necessary for the particular FET to be driven are adequate. Transistors Q1 and Q4 are p-channel FETs, while transistors Q2 and Q3 are n-channel FETs. Because the p-channel FETs are "on" when the gate charge is 12 v dc below the +vdc motor voltage, the TC4803 is used instead of the TC4804 since the gate driver signal must be inverted.

The input side of the TC4803 utilizes the same +5 volt and ground return as the digital motor controller 16. However, in contrast to conventional designs, the output of the TC4803 is powered by the isolated 12-volt output of power supply 14. The isolated 12-volt supply for the TC4803 driver side is common to the positive side of the motor driver voltage, while the negative side of the 12-volt supply on the TC4803 driver side is completely isolated. This enables the TC4803 to always operate with 12-volts to drive the charge for the high side, p-channel FET gates, regardless of the voltage used to actually drive the motors, while the isolated ground "floats" at 12-volts below the motor driver voltage.

Figure 2I:
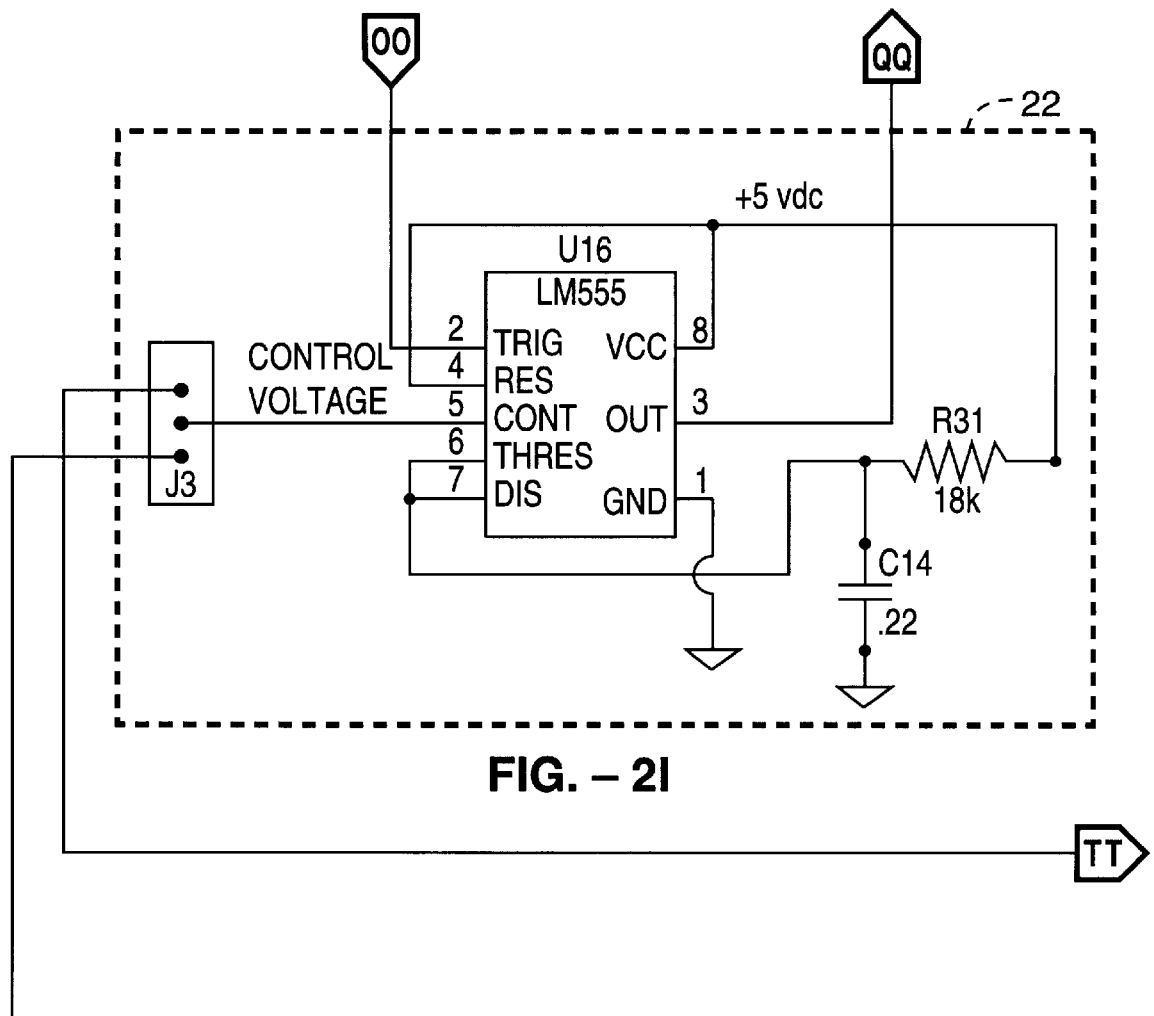
Figure 2J:
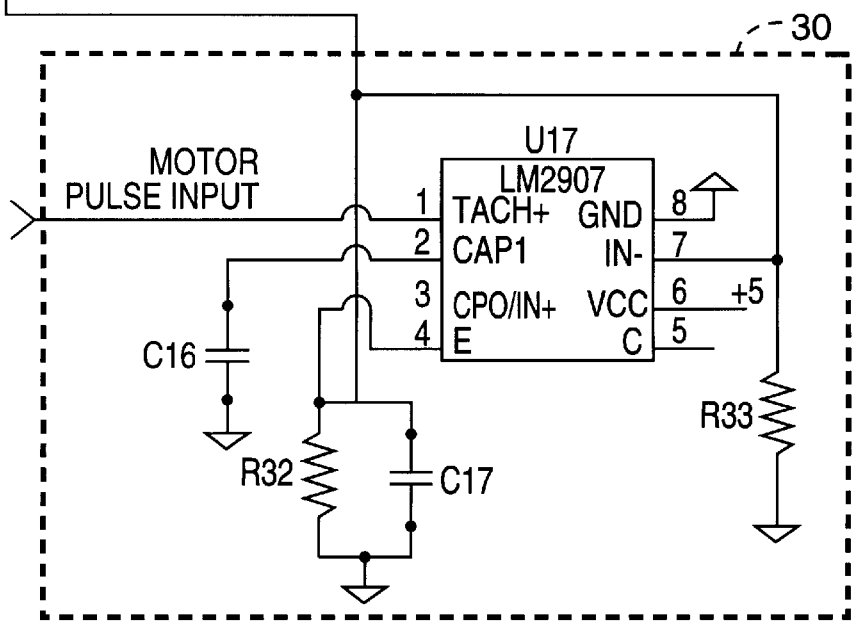
Figure 2K:
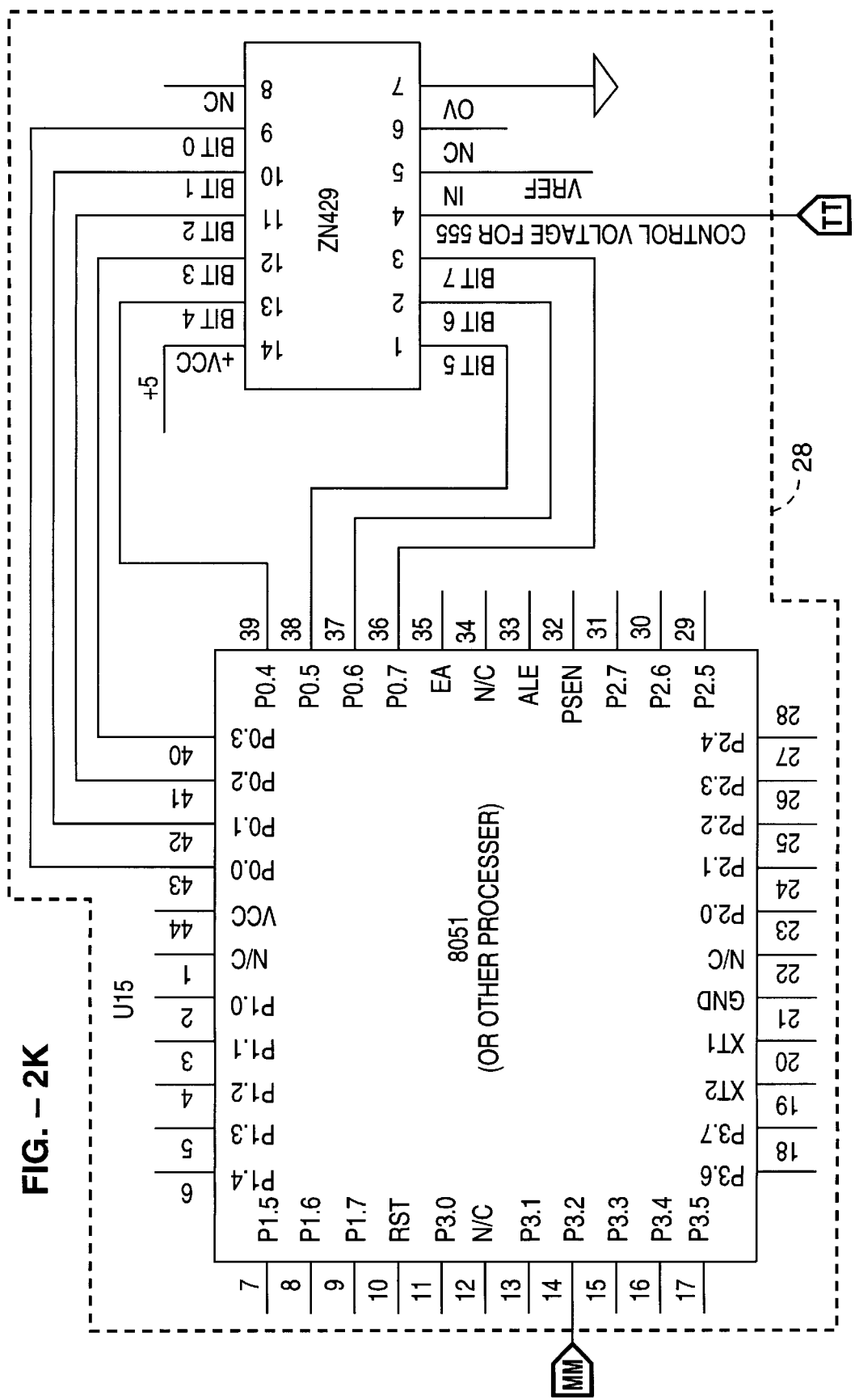
Figure 2L:
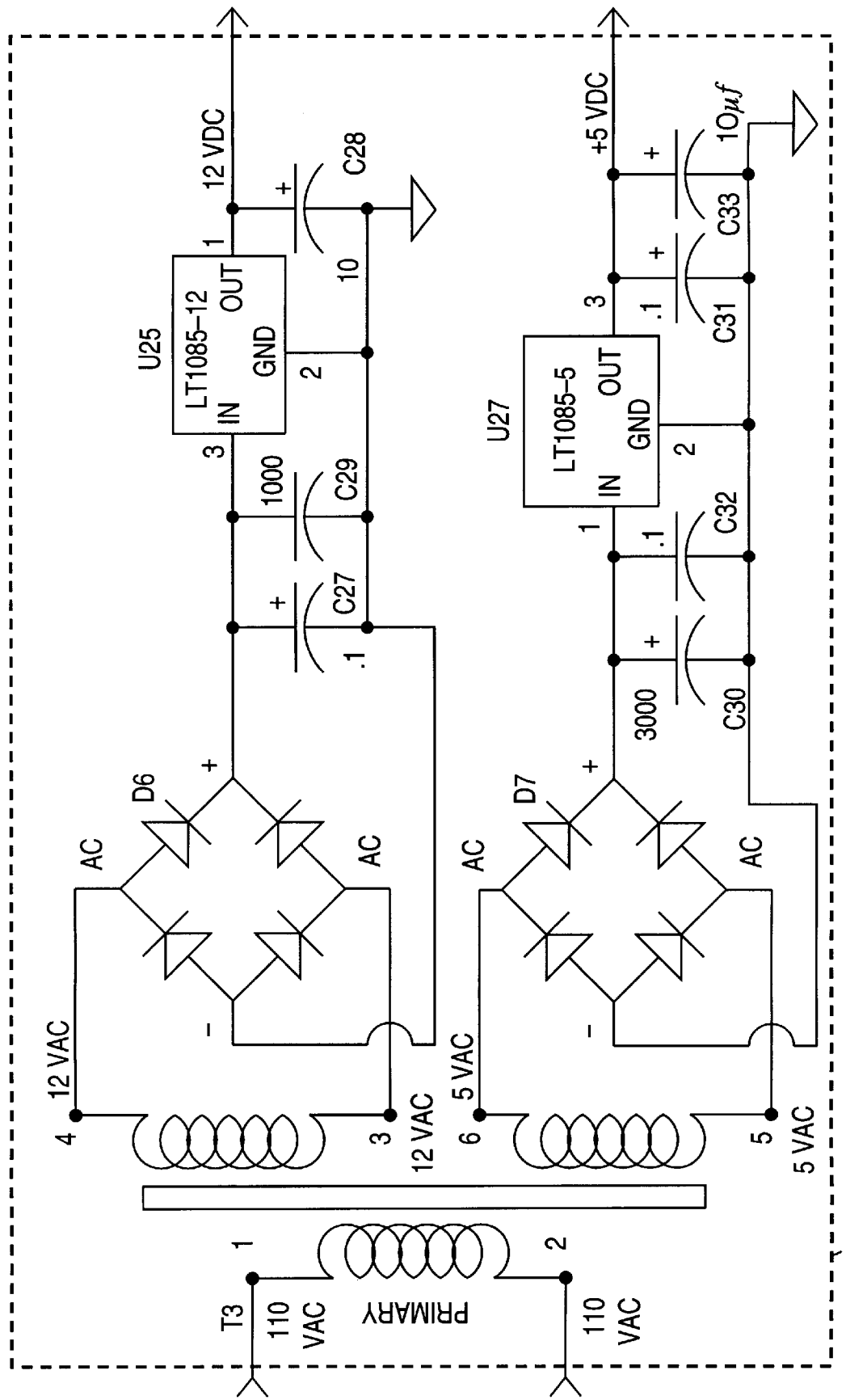

Referring also to FIG. 2L, the TC4804 drivers for the low side, n-channel FETs Q2 and Q3 are driven from a non-isolated linear power supply 18. Power supply 18 provides both a 12-volt and 5-volt output, and has a ground common to the digital control circuitry and the power supply for the motor switching circuit.

The 330 ohm resistors on the input and output of the TC4803/04 drivers are for current limiting. The 0.1 uf capacitors across the output of TC4803/04 bypass noise and prevent the TC4803/04 drivers from oscillating.

Note also that, where more than one motor is being controlled, each motor should have separate isolated high side FET driver power supplies.

2. Elimination of Back EMF

When the electrical power applied to the motor coil by a conventional H-Bridge is turned off, the magnetic field in the motor collapses and the unused energy (i.e., the energy not converted into mechanical work), along with the additional energy from the motor acting as an electrical generator (i.e., the mechanical momentum of the armature), flows back into the FETs comprising the H-Bridge, particularly the high side FETs. This energy can be quite large and can damage or destroy the high side FETs if they are not protected.

The present invention, however, significantly reduces the back EMF problem by controlling the amount of voltage applied to the motor for the given speed of operation as described below. However, even with this variable power technique (current chopping plus voltage varying with speed), excess charge still builds up on the gates of the high-side FETs causing undesired switching characteristics. Accordingly, the present invention presents two alternative solutions to the remaining back EMF problem which can be employed individually or in combination.

Referring to FIG. 2A, the first solution is the addition of a "fifth" power transistor Q5 to the H-Bridge that connects the motor coil (generally through an unused center tap on the motor coil) to ground when the other transistors in the H-Bridge are turned off. This provides a clear pathway for the unused energy to be removed from the driver circuit without interfering with the normal switching of the FETs. Preferably the back EMF transistor comprises a low cost, logic level n-channel FET with low "on" resistance and a sufficiently fast switching speed to meet the maximum speed for the H-Bridge operation. This permits the motor driver control circuitry to generate a simple logic level "on" signal for transistor Q5 when neither leg of the H-Bridge drivers are turned "on" and generates a logic level "off" signal for transistor Q5 when either leg of the H-Bridge drivers are "on". The voltage and current ratings of transistor Q5 should be about the same as for Q2 and Q3, the n-channel FETs comprising the low side drivers. Quite surprisingly, the inclusion of transistor Q5 not only reduces back EMF, but also reduces transient noise in the motor and digital logic power supplies. Ringing in the motor and other power supplies which otherwise occurs when the FET drivers are switched off is significantly dampened when transistor Q5 is placed in the circuit. And, to balance circulation flows, it has been found that a resistor having a value of approximately zero to two ohms can be placed in series with transistor Q5 and circuit ground, as desired.

The logic circuit to control transistor Q5 can be implemented in a variety of ways, including discrete logic parts or a single programmable logic IC. An example of a timing diagram for this purpose can be seen in FIG. 3 and FIG. 4.

Figures 3, 4:
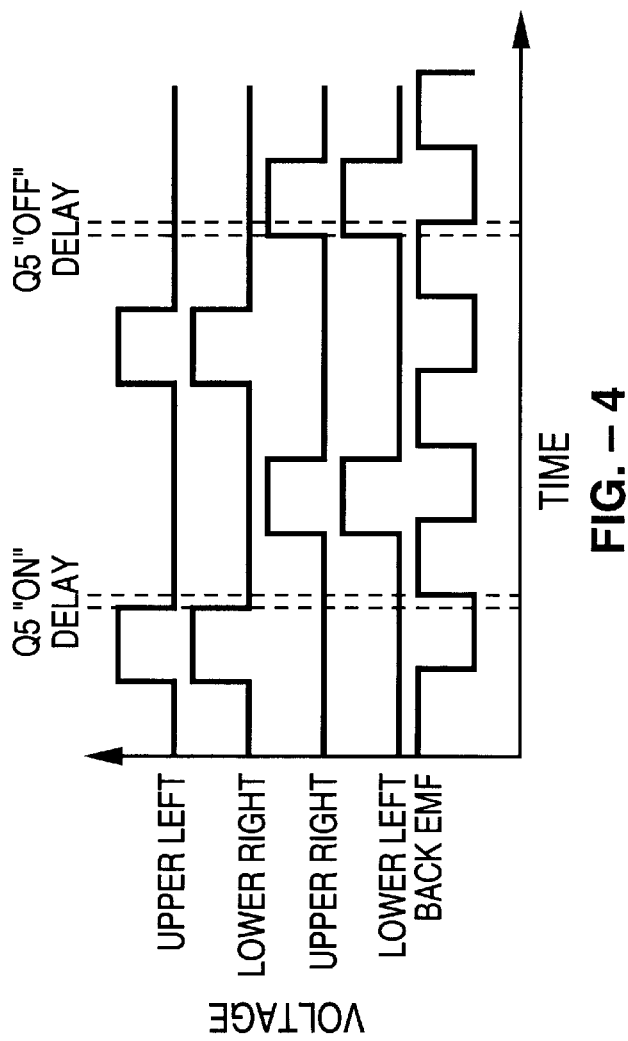
FIG. 3 is a logic table showing the relationship of the solid state switches shown in FIG. 2B at various switching states where a solid state switch is connected between the motor tap terminal and circuit ground.
FIG. 4 is a timing diagram corresponding to the logic states shown in FIG. 3.

In addition to the reduction of back EMF and excess energy, the use of transistor Q5 also enables the inductive load seen by the H-Bridge at "turn on time" to be switched between either one-half or the full amount. As well known in the industry, connection to one-half of the motor coil usually results in greater maximum speed, but with reduced torque, while connection to the full motor coil usually results in lower maximum speed, but with greater torque. By controlling the timing of the rising and falling edges of the logic signal for transistor Q5, transistor Q5 can be made to stay on for a "delay" period during the beginning of the next FET "on" cycle (e.g., for 50 to 250 nanoseconds) as shown in FIG. 4, thereby effectively making the inductive load seen by the H-Bridge to be one-half of the full coil. This greatly increases the maximum operating frequency, yet still permits greater torque loads than if the system was hard wired for half-coil operation. Additionally, since FET's typically have a "fall" time where there is a delay in turning off, to eliminate transconductance it is desirable to delay the turn on of transistor Q5 for approximately 50 to 250 nanoseconds to ensure that the FET's are turned off. This delay is also shown in FIG. 4.

Figures 5, 6:
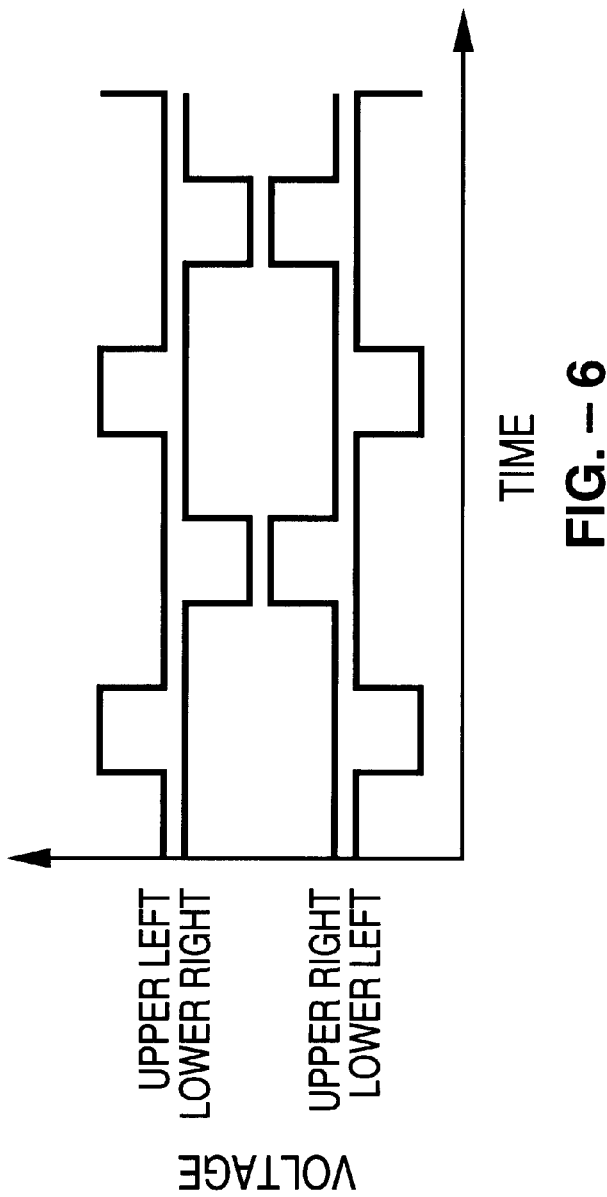
FIG. 5 is a logic table showing the relationship of the solid state switches shown in FIG. 2B at various switching states with the solid state switch connected between the motor tap terminal and circuit ground removed from the circuit.
FIG. 6 is a timing diagram corresponding to the logic states shown in FIG. 5.

The second solution is to employ a unique switching sequence for the H-Bridge as shown in FIG. 5 and FIG. 6. Instead of turning the low side FETs "off" between motor clocks (i.e., before reversing direction), the low side FETs are both "on" during the "off time" period. This connects both ends of the motor coil to ground during the "off" period, thereby draining the coil of unused energy.

The results of either method are a significant improvement: motor speeds can be increased dramatically (from 50% to 200%) and power losses and heat dissipation in the FETs are greatly reduced. Note also, that both techniques can be combined as desired.

3. Triac Motor Voltage Control

In order to make motors turn at faster speeds, it is generally necessary to apply greater amounts of electromotive force (voltage) to overcome the increasing resistance of the motor armature (i.e., inductive reactance is proportional to speed). Generally, the higher the voltage, the higher the possible motor speed. However, when a fixed high voltage is applied to increase the maximum possible speed, the motor's low speed operation is degraded by increased vibration, noise, and current resonance and, in the case of stepping motors, by increased likelihood of missed steps.

To solve the conflict between the need for greater speed (with higher voltages) and smoother, quieter operation (with lower voltages), the present invention employs alternative analog and digital circuits that automatically vary, in real time, the voltage applied to the motor depending upon the motor switching speed. Referring more particularly to FIG. 2F, both the analog and digital circuits used for matching motor voltage with motor speed are based on an opto-isolated, high voltage triac and unfiltered bridge rectifier motor voltage control 20 to supply the final output voltage.

Triac motor voltage control 20 essential comprises two main sections. The first is the full-wave rectified DC supply; the second is the triac and driver circuit. The triac driver portion of the circuit receives a triac firing signal generated by either the analog or digital circuitry. These alternative sources of the triac firing signal are represented by the alternative jumper positions shown on J1 as can be seen in FIG. 1 and FIG. 2F.

The triac DC supply comprises a conventional design: the secondary of a transformer T2 feeds a full wave bridge rectifier D3. However, unlike a conventional linear power supply, the output of the full-wave bridge rectifier is not filtered by a capacitor or inductor. This results in a 120 Hz full wave DC voltage. The transformer secondary and full wave bridge are selected to provide the maximum desired motor voltage and current.

The circuitry for triac motor voltage control 20 is straightforward and follows standard design criteria for such devices (see e.g., Motorola Application Note AN-780A for a full discussion of the design principles). The triac D4 is turned on by a MOC3011 or like opto-isolated triac driver U7. Resistor R4 limits the amount of current driving the triac gate and resistor R2 and capacitor C4 act as a snubber. Resistor R5 limits the amount of input current to driver U7. The triac is gated on sometime during the half wave cycle present in the DC supply voltage, depending upon the voltage desired. The earlier in time that the triac is turned on, the greater the DC voltage output to the motor. The maximum voltage is typically reached when the triac is turned on for about 70% of the DC half wave, and the lowest DC output voltage is obtained when the triac is turned on just before the DC half wave reached the next zero current point.

Figure 7:
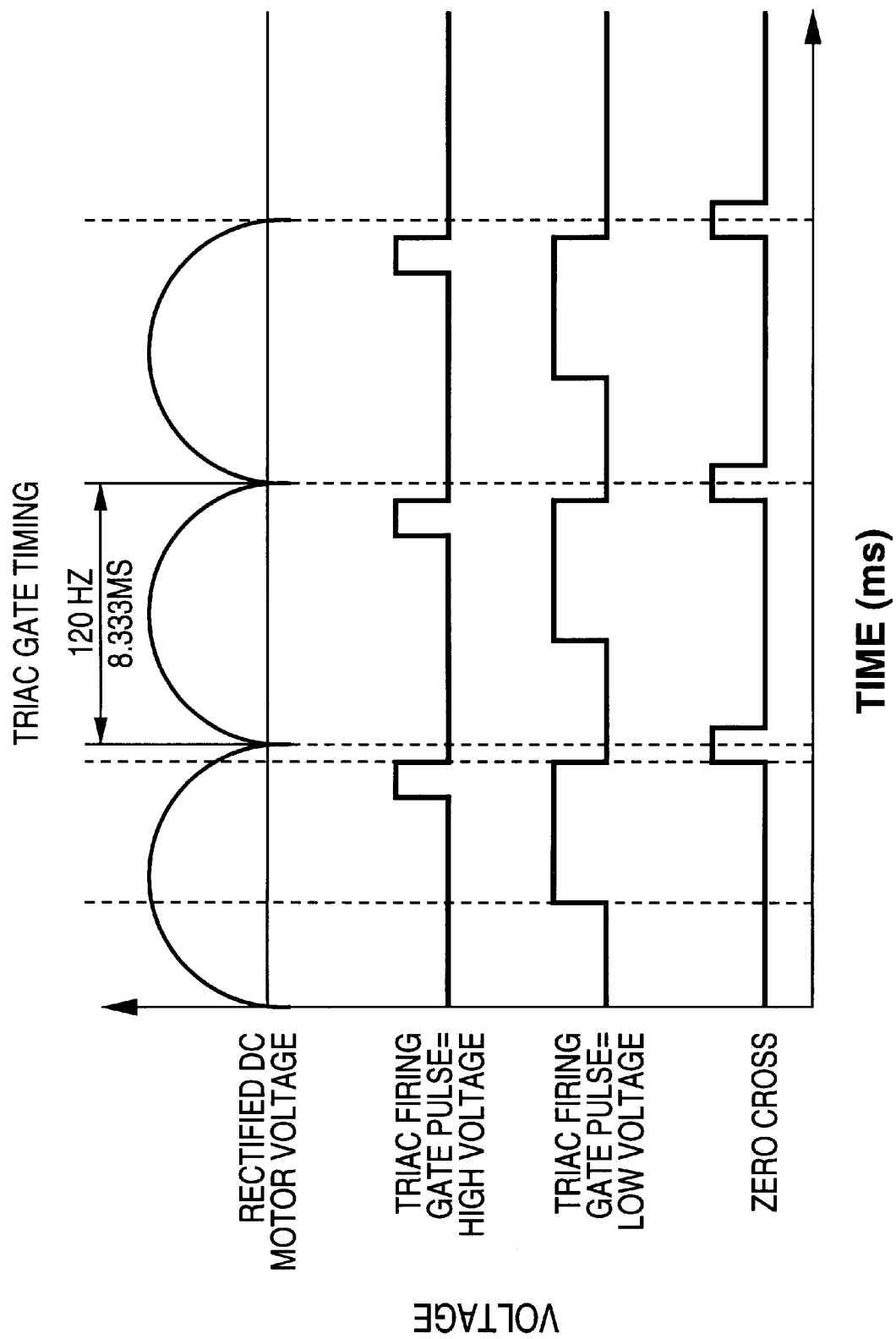
FIG. 7 is a timing diagram of triac firing sequence employed in the present invention showing the relationship between the triac firing sequence, the rectified direct current motor voltage, and the zero crossing points for the triac gate signal.

The timing signal fed into driver U7 must be synchronized with the zero crossing point and vary in width (i.e. in time) in relationship to the motor speed. Both the analog and digital control methods of the present invention operate by adjusting the firing point of the triac between the 8.33 millisecond zero voltage points of the half wave DC voltage. The lowest voltage is generated when the triac is turned on just before the next zero voltage point, and the highest voltage is generated when the triac is turned on several milliseconds before the zero voltage point (5–6 milliseconds typical). FIG. 7 graphically shows the relationship between these parameters.

Those skilled in the art will appreciate that the high voltage for the motor can also be generated by other means, including AC to DC or DC to DC switching power supplies.

(a) Analog Firing Signal Circuitry

The analog method operates by means of a pulse width modulation (PWM) waveform that is synchronized with the 120 Hz full wave DC voltage being controlled by the triac. Referring to FIG. 2I, the PWM signal is generated by a PWM timer 22 which includes a 555 timer chip or the like as a simple and inexpensive means of generating the synchronized PWM signal. The 555 timer is made to oscillate by capacitor C14 and resistor R31 at about 100 Hz. The oscillation is then synchronized with the 120 Hz full wave voltage by one of several means, including the use of a zero crossing chip such as the HPCL-3700 in an integrated zero crossing detector 24 as shown in FIG. 2C or, alternatively, a simple half wave diode detector circuit 26 as shown in FIG. 2D can be used as the zero crossing detector.

The integrated zero crossing detector 24 requires a low voltage AC signal (5–12 volts) that is in phase with the high voltage AC fed to the bridge rectifier D1 in the isolated high side FET driver power supply 14. One problem with the HPCL-3700, however, is that the zero crossing point signal is rather wide in width, making the synchronization less precise. The diode zero crossing detector circuit 26 employs a half wave rectifier circuit with a current limiting resistor and zener diode to safely limit the current and voltage to a desired level. Although this method uses a few more discrete parts, it is inexpensive and provides a narrower zero crossing signal. These alternative sources of a zero crossing signal are represented by the alternative jumper positions shown on J2 as can be seen in FIG. 1 and FIG. 2D.

Note that noise can be a significant factor in either circuit that can cause false zero crossing signals. Therefore, care must be taken to minimize such effects or the triac will be fired inadvertently, thereby keeping the DC motor voltage higher than desired.

Referring again to FIG. 2I, the width of the PWM signal from the 555 timer is controlled by a voltage signal applied to the control pin of the 555 timer. By adjusting this control voltage as the speed increases or deceases, the PWM signal width is correspondingly varied, which in turn varies the firing point of the triac, with the result that the DC voltage outputted from the triac is raised or lowered with the speed of the motor. This control voltage can be generated several different ways. The larger the voltage, the greater the width of the output signal. The wider the output signal, the earlier in the timing cycle the triac is fired, and thus, the greater the DC voltage sent to the motor.

For example, referring to FIG. 1 and FIG. 2K, a microprocessor can be used to drive a digital to analog converter (DAC), thereby forming a microprocessor/DAC module 28 that outputs the required control voltage. This requires that the microprocessor know at what speed the motor is supposed to be operating, and then output the correct digital value to the DAC. In other words, the microprocessor must be programmed to increase the DAC output voltage as the speed increases. The advantage to this method is that software can easily be created for the microprocessor that not only takes into account the motor speed, but other parameters such as the frequency response curve for the particular motor. For example, tables of various "optimum" motor performance curves that correlate switching frequency and motor voltage and current profiles can be stored in memory and selected by the user at will.

Referring to FIG. 2J, another technique is to use a frequency to voltage converter circuit 30 (e.g., an LM2907 or the like) operating in a tachometer mode so that an output voltage is generated in proportion to the input speed. This device develops a voltage output relative to the input frequency on the tachometer input. The values of resistor R32, capacitor C16 and capacitor C17 should be chosen to obtain an output voltage that has the desired range for the 555 timer. This method is simple and inexpensive, and would also require some empirical testing to find the optimum parts values. No correction for motor electromagnetic characteristics or torque load, however, is possible.

Of the foregoing two methods, microprocessor/DAC module 28 is preferred because of greater precision of control over the output of the 555 timer. However, this circuit is much more expensive and takes up more space. These alternative sources of control voltage for PWM timer 22 are represented by the alternative jumper positions shown on J2 as can be seen in FIG. 1 and FIG. 2I.

(b) Digital Firing Signal Circuitry

Figure 8:
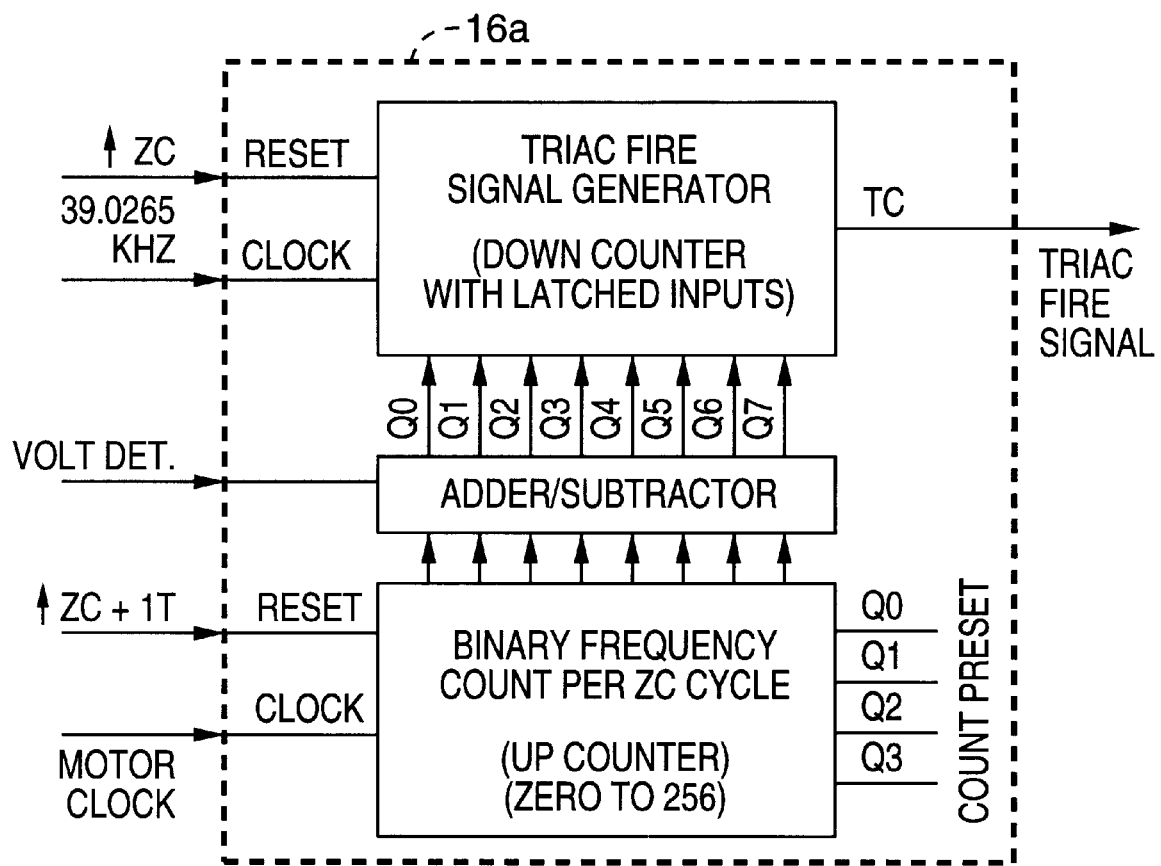
FIG. 8 is a functional block diagram of the voltage controller element of the present invention shown in FIG. 1 and FIG. 2G.
Figure 9:
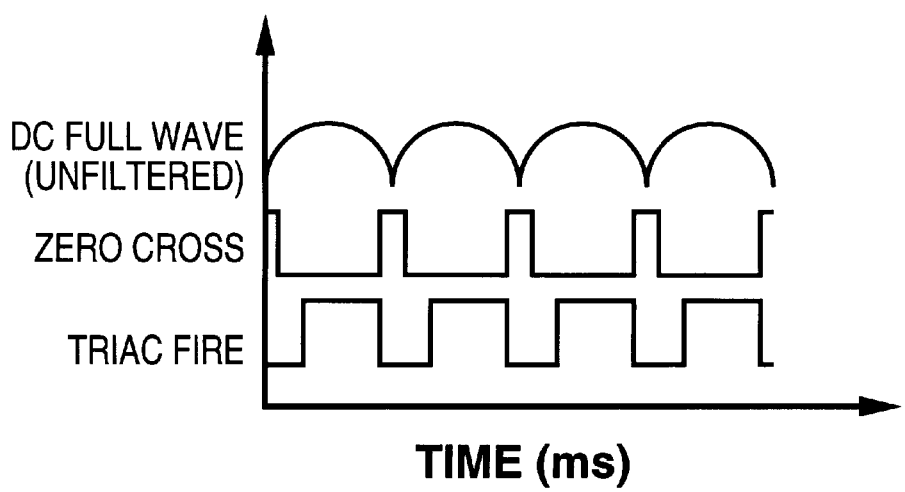
FIG. 9 is a timing diagram showing the relationship of the triac firing pulses produced by the voltage controller of FIG. 8, the motor control voltage, and the zero crossing points.
Figure 10:
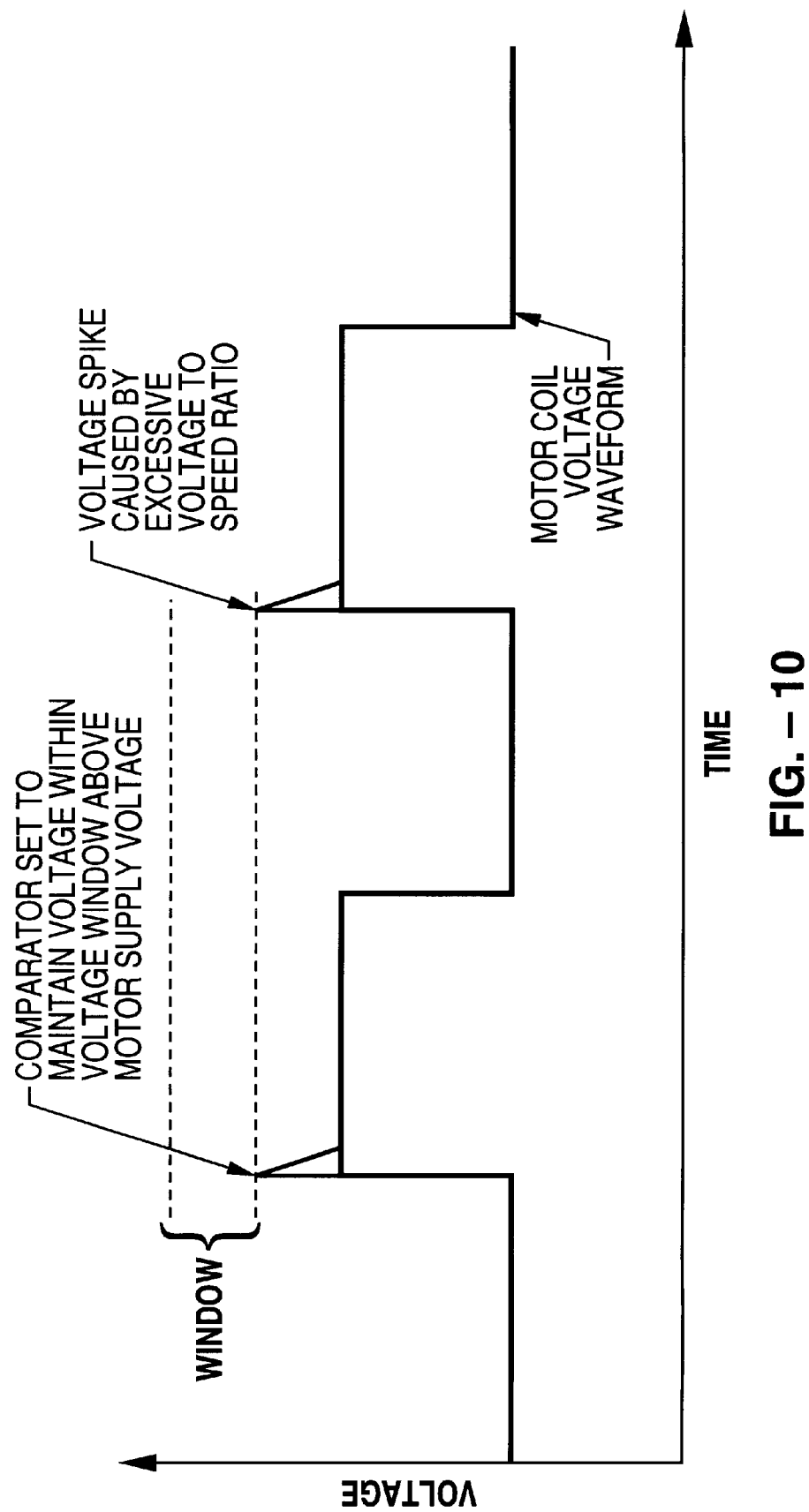
FIG. 10 is a timing diagram showing the relationship between the motor coil voltage and voltage spikes caused by excessive voltage to speed ratios of the motor which are sensed and corrected by window comparator employed in the present invention.

Referring to FIG. 1, FIG. 2G, FIG. 8 and FIG. 9, the digital method of generating the triac firing pulse uses a digital voltage controller 16a. The principal behind the digital method is the division of the 8.33 millisecond time interval between 120 Hz zero crossing points into many small time increments (microseconds in width) and then using the motor speed signal to gate the number of these time interval signals passing through a counter between zero crossing points. The zero crossing signal is used to synchronize the gating of these time interval signals with the 120 Hz half wave. The slower the motor speed, the more small time increments pass through a counter, the closer in time before the next zero crossing point that the triac fire control signal is turned on, and the lower the voltage provided to the motors. The faster the motor speed, the fewer small time increments pass through a counter, the further in time before the next zero crossing point that the triac fire control signal is turned on, and the higher the voltage provided to the motors. Referring to FIG. 9, as indicated previously, the width of the firing pulse determines the amount of triac firing time.

Therefore, the digital method involves a specially designed counter that can be programmed at a fixed value or that can be programmed in real time by a microprocessor. These counters create a PWM firing signal similar to that generated by the 555 timer chip. The primary advantage is that the digital circuit is not as suspectable to environmental or noise conditions and can be adjusted in real time with a simple serial or parallel data interface.

Referring to FIG. 8, digital voltage controller 16a includes one set of counters that divides up the time interval between the 120 Hz zero crossing points into discrete time intervals (i.e., times pulses or "counts"). In turn, another set of programmable counters controls the number of "counts" used between the leading and trailing edges of the firing signal, thereby effectively creating a PWM signal to control the triac. Lastly, the operation of the counters are synchronized with a timing signal for the 120 Hz zero crossing of the half wave DC motor voltage. This can be done be the same means as for the analog circuits: a zero crossing detector circuit such as the HPCL-3700 chip, or a simple diode detector circuit, as shown in FIG. 2C and FIG. 2D.

With regard to the down-counter portion of digital voltage controller 16a, the triac fire signal TC is set high on the rising edge of the zero crossing signal and then low when the count is zero. The counter is reset to zero on the rising edge of the zero crossing signal and a new count value is latched in with a time delay of 1T, where T=$\frac{1}{48}$ Khz. The up-counter portion is reset to zero on the rising edge of the zero crossing signal, and counts above 256 are ignored.

Note that the width of the firing signal is proportionate to the number of motor clock switching pulses. Similar to the analog method employing a microprocessor and DAC, the counters controlling the width and number of timing pulses between the leading and falling edges of the PWM firing signal can be set in real time with a microprocessor. This permits memory "profiling" for specific motors.

4. Window Comparator

Even with the various circuits and methods for controlling the motor voltage in relationship to the motor switching speed described above, it is still very difficult to precisely match the motor voltage to speed so that optimum power switching characteristics are obtained during all manners of motor operation. For example, a very close match can be obtained provided that sufficient empirical testing is done with a particular motor and load to be driven so than an accurate voltage/speed profile can be stored into memory.

Therefore, referring to FIG. 1 and FIG. 2E, the present invention includes a window comparator 34 to monitor the match between the switching speed and motor voltage and then make real time corrections in the applied voltage. Window comparator 34 compares the voltage being delivered to the high side FETs in the H-Bridge with the voltage delivered across the actual motor coil, and then delivers an adjustment signal to either microprocessor/DAC 28 or to digital voltage controller 32, depending upon which particular circuitry is employed.

In theory, these two voltages (that of the power supply and that applied to the motor coil) should be very close to each other at all times. The differences due to the high side FET "on" resistance and other similar electrical characteristics do not create a very significant voltage differential and thus can be ignored for practical purposes. Also, as discussed below, the voltages applied to the comparator inputs are adjusted to obtain a good operating relationship. However, the inductance of the motor (and of the entire pathway between the FETs and the motor) causes a voltage spike upon turn on of the circuit. This spike increases dramatically as the voltage exceeds that needed for a given speed and work load. If the spike gets too large, it can lead to failure of the FETs.

While the voltage spike can cause serious problems when untreated, it also provides some very useful information about the performance of the H-Bridge-motor system. Namely, it can inform about the amount of energy required to move the armature at a given speed. Rather than simply bypass off all of this excess energy around the circuit with a snubber, the preferred approach is to reduce the amount of energy being put into the system in the first place. In other words, to balance the amount of energy applied to the motor at a given speed and work load. The preferred way to measure the amount of energy is simply to monitor the voltage spike on the motor coil using a voltage comparator.

The voltage comparator feed backs a logic signal (active high and/or low as desired) to the circuit (or microprocessor) that controls the motor voltage. When the voltage goes below the present threshold, the signal is low and vice versa. Depending upon what type of voltage goes below the present threshold, the signal is low and vice versa. Depending upon what type of voltage control circuitry is used, a single or dual window comparator can be employed to generate one logic signal for a low voltage condition and a separate logic signal for a high voltage condition. Preferably, however, a dual window comparator as shown in FIG. 2E is used.

In the circuit shown in FIG. 2E, resistor R86, resistor R87 and potentiometer R88 form an adjustable voltage divider input to the voltage comparator U75, which is a MAX916 or the like, for the output voltage across the motor coil that fed into the plus input of one of the comparators. Resistors R91 and R92 form a fixed voltage divider for the motor voltage that is fed into the minus input of the comparator. This acts as a fixed reference voltage for the comparator. When the output voltage at the motor coil is less than the motor supply voltage, then the output of the comparator goes high. The second comparator, which is configured in a similar manner, monitors over-voltage conditions, and the outputs of the two comparators are fed to an adder/subtractor which outputs the appropriate adjustment signal. The isolated adjustment signal is then fed back into the source for the triac firing signal, i.e., into the microprocessor that sets the voltage for the 555 timer control input line or into the programmable counter circuit that generates the digital triac firing signal. Whenever the actual voltage on the motor coil exceeds the motor voltage from the motor power supply the motor voltage control circuit turns down the voltage to the motor until the voltage spike on the coil comes within the desired maximum range (e.g., no more than 5 volts above the motor supply voltage). As can be seen with reference to FIG. 10, the adjustable voltage divider allows the actual trigger voltage level to be set at the desired voltage above the motor supply voltage so that the effects of noise and random fluctuations in the motor output voltage do not trigger the comparator.

5. Digital Current Timer

Instead of measuring the current rise in the motor H-Bridge with a sensing resistor and analog comparator circuit that "chops" the H-Bridge driver signal when the desired current level is reached, the amount of time that it takes for the current in the motor to rise to the desired level can be calculated [dT=L(dI)/V, where T=time, L=inductance in henrys, I=current in amps, and V=voltage] and preprogrammed into a digital circuit that will measure the amount of H-Bridge "on time" and then "chop" the H-Bridge logic driver signals when enough time has passed to attain the calculated motor current. This eliminates external, discrete components (such as a sense resistor, comparator, voltage reference) and is not subject to noise interference. Moreover, many types of motor driving sequences can be achieved with the same circuit (such as half or micro-stepping) simply by programming the memory stack with the appropriate current levels. Indeed, this circuit can be used in real time to tune out resonances in the motor (at certain speeds) and to adjust the current delivered to the actual work load on the motor.

Figure 11:
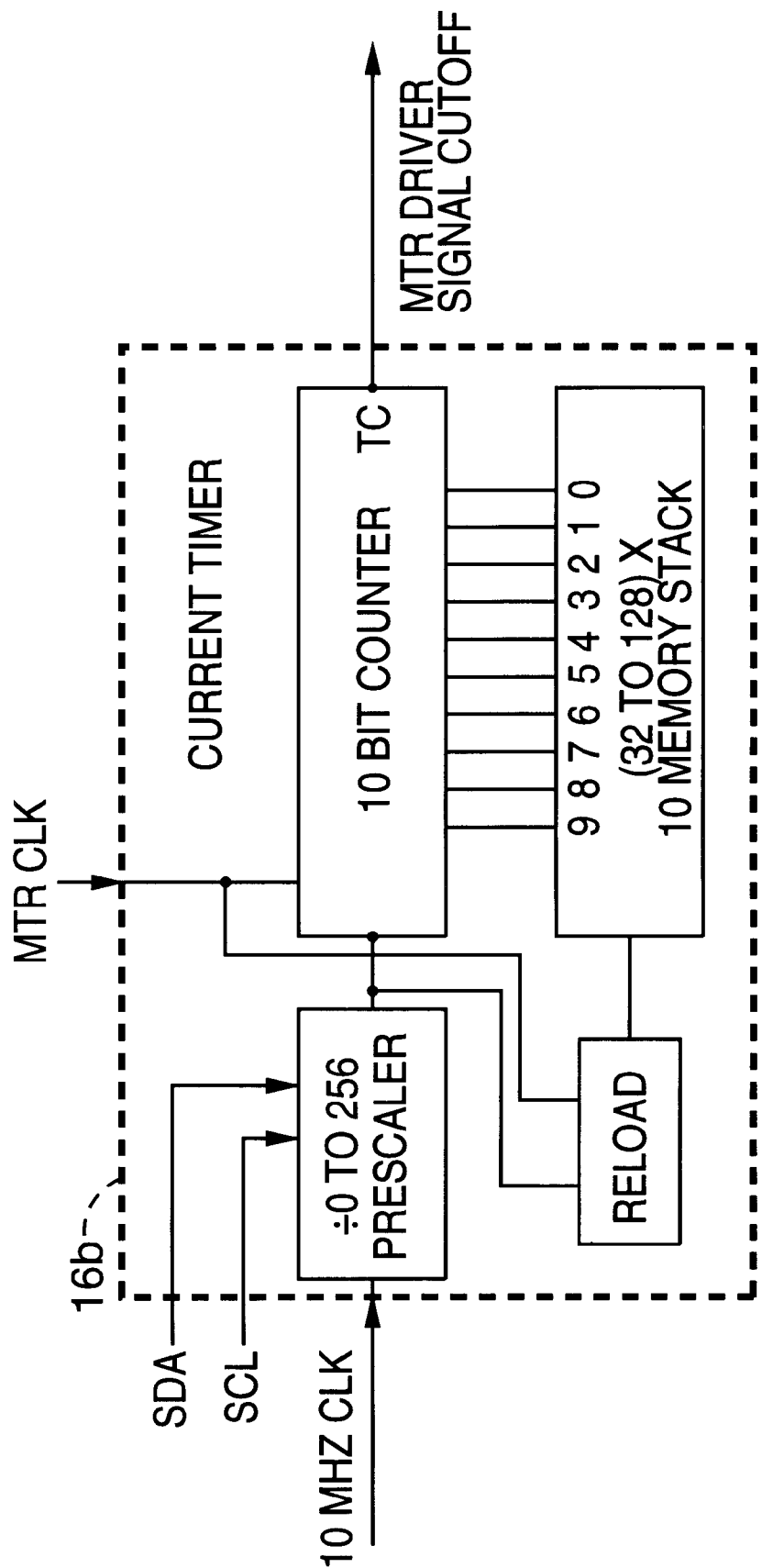
FIG. 11 is a functional block diagram of the current timer element of the present invention shown in FIG. 2G.
Figure 12:
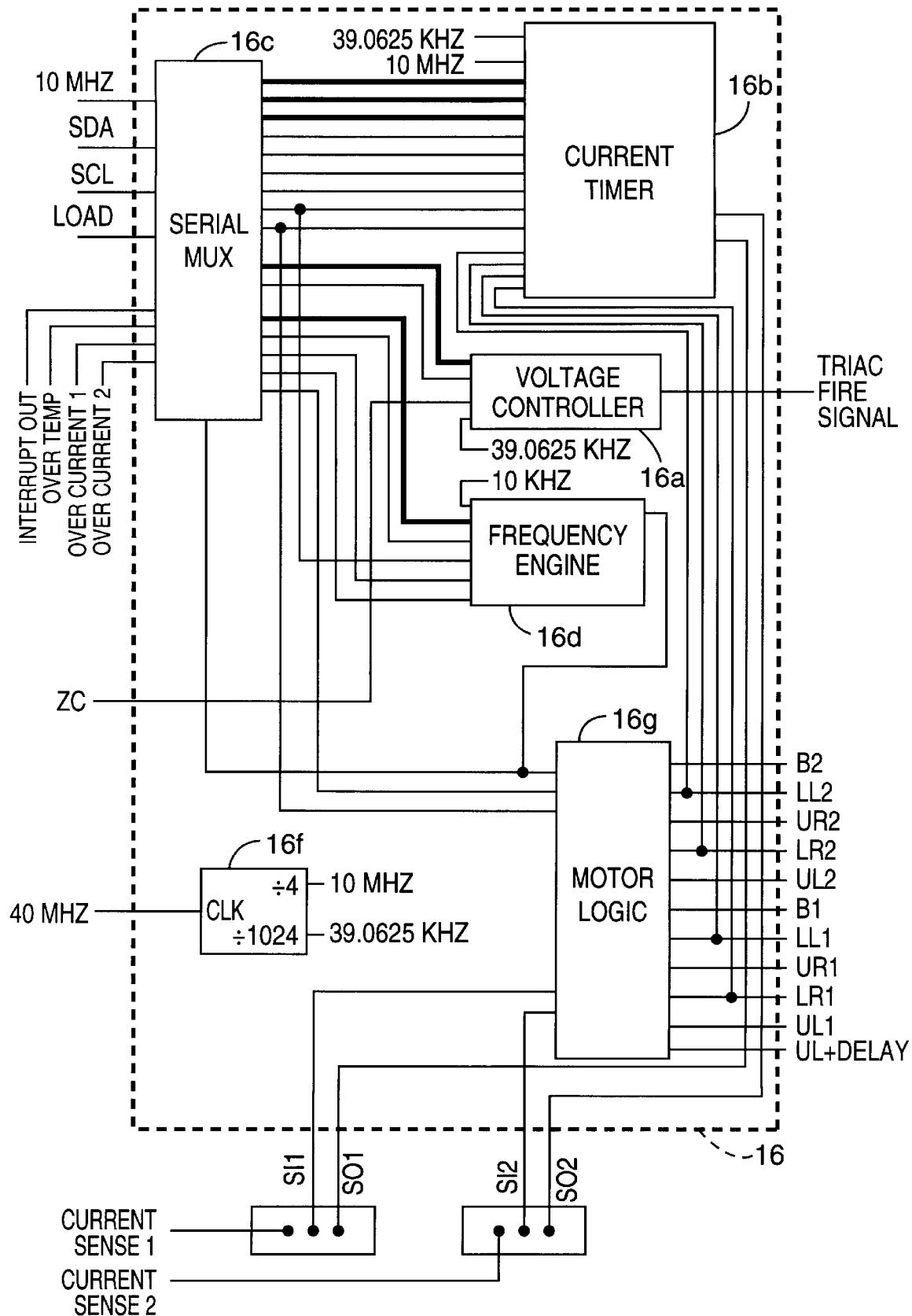
FIG. 12 is an alternative embodiment of the digital motor controller element of the present invention shown in FIG. 1, FIG. 2G and FIG. 2H.

As can be seen in FIG. 2G and FIG. 11, a digital current timer 16b in accordance with the present invention comprises two main elements. The first is a ten bit, presettable counter and the second is a ten bit wide, 32 (or greater) deep, programmable memory stack. The counter is clocked by a 10 Mhz input signal, while the motor clock signal is used to enable and reload the counter with a preprogrammed value stored on the ten bit wide memory stack. With the rising edge of the motor clock signal the next value in the program stack is loaded into the counter and the counter is enabled. The 10 Mhz signal then clocks the counter until the count equals the pre-loaded value, at which point the counter outputs a terminal count signal (TC) that resets to the off state the logic gates controlling the logic drive signals for the H-Bridge. The current counter is disabled on the falling edge of the motor clock and remains disabled until the next rising edge of the motor clock.

A further refinement would be to create a digital feedback loop between a digital voltage control circuit and the digital current control circuit such that the current controller is automatically adjusted in proportion to the motor voltage (which changes with motor speed). The end result is a fully digital, real time, motor controller with automatic power (voltage times current) control.

6. Digital Motor Control

Referring to FIG. 1, FIG. 2G and FIG. 2H, the H-Bridge motor driver 10 is controlled by digital motor controller 16 which, in turn, is operated by system control microprocessor 34 which is a conventional embedded controller. Digital motor controller 16 includes communications interfaces to receive control data from system control microprocessor 34 as well as the logic control circuitry to operate the FET drivers in H-Bridge. Preferably, these components are housed on an FPGA or ASIC chip, which also includes digital voltage controller 16a and current timer 16b, along with a serial multiplexer 16c, frequency engine 16d, pulse counter 16e, clock frequency divider 16f, and motor driver logic 16g.

Referring now to FIG. 12 through FIG. 17, an alternative embodiment of digital motor controller 16 can be seen. There are several unique features to the current timer employed in this embodiment. First, the current timer can be used for either half-step or microstep (i.e., current step) switching modes. Second, the digital current timer is immune to external noise. This can be a serious problem in most stepper motor drivers, especially at low speeds and/or high current (torque) demands. Third, the digital current timer also eliminates the need for a current sensing resistor and circuit (comparator and latch). This not only saves components and board space, but allows larger currents to be used because there is no current sensing resistor to contend with.

(a) "Half-Step" Digital Current Timer

Instead of using an external current sense resistor and comparator circuit to detect when the H-Bridge has reached the desired current level in the motor, the present invention uses a digital circuit (which requires no external sense components) comprising a sixteen bit down counter which is reloaded at the beginning of each lower left or lower right FET "on" signal with a value sent from a microprocessor via a three wire serial interface. When the down count reaches zero, the TC output of the counter is active and latches the current limit output, thereby turning off the upper right FET or upper left FET, whichever is then active. Thus, the lower FET signals (LL and LR) are always allowed to operate for the entire half step clock cycle, while the upper FET signals (UL and UR) are active only until TC is reached in each respective counter. Each motor coil (phase) uses its own down counter system, and the value sent over the three wire serial interface is loaded into the respective down counter for each motor coil at the beginning of its respective timing phase. An exemplary phase diagram is shown in FIG. 18.

(b) "Current Step" Digital Current Timer

Similar to the half step digital current timer, the current step (also known as microstep) digital current timer, does not employ any external sense components.

It is well known that the clock phase cycle for current stepping is the same as that for full stepping. However, similar to half stepping, in the present invention the lower FETS are not chopped but are allowed to complete their respective full step clock cycles. The primary difference is that, in current stepping, an additional four bit counter is used to create sixteen delta steps that are the product of the four bit counter value and its inverse (which is created by a one's complement inverter), each multiplied by a delta scaler value that is loaded from the microprocessor via the three wire serial interface. These two values (one of which is increasing while one is decreasing with each motor clock pulse) are multiplexed into the two sixteen bit down counters that were used in half step mode upon each motor clock pulse. In turn, the sixteen bit down counters now provide the ascending and descending current value profiles for both motor coils. One sixteen bit down counter, loaded with its respective delta value, is used for the "up" current profile, activates the respective upper FET until its TC is reached. Then it is reloaded with fall time data which inhibits the same respective FET until TC is reached. Then it is reloaded with rise time data which activates the respective upper FET until TC is reached. This "fall/rise" cycle is repeated until a new motor clock signal is received. The rise and fall time data sent by the microprocessor must be of such values as to hold the current level for the duration of the respective "micro" portion of a full step (i.e., until the next motor clock signal is received).

The other sixteen bit down counter is used for the "down" current profile. It is first loaded with its respective down delta data and inhibits the respective upper FET until its TC is reached. This counter is then reloaded with rise time data and enables its respective upper FET until TC is reached. It is then loaded with fall time data and inhibits its respective upper FET until TC is reached. This "rise/fall" cycle is repeated until a new motor clock signal is received. This holds the current level through the remainder of the respective "micro" portion of the full step (i.e., until the next motor clock signal is received).

(c) Digital Voltage Controller

Figure 13:
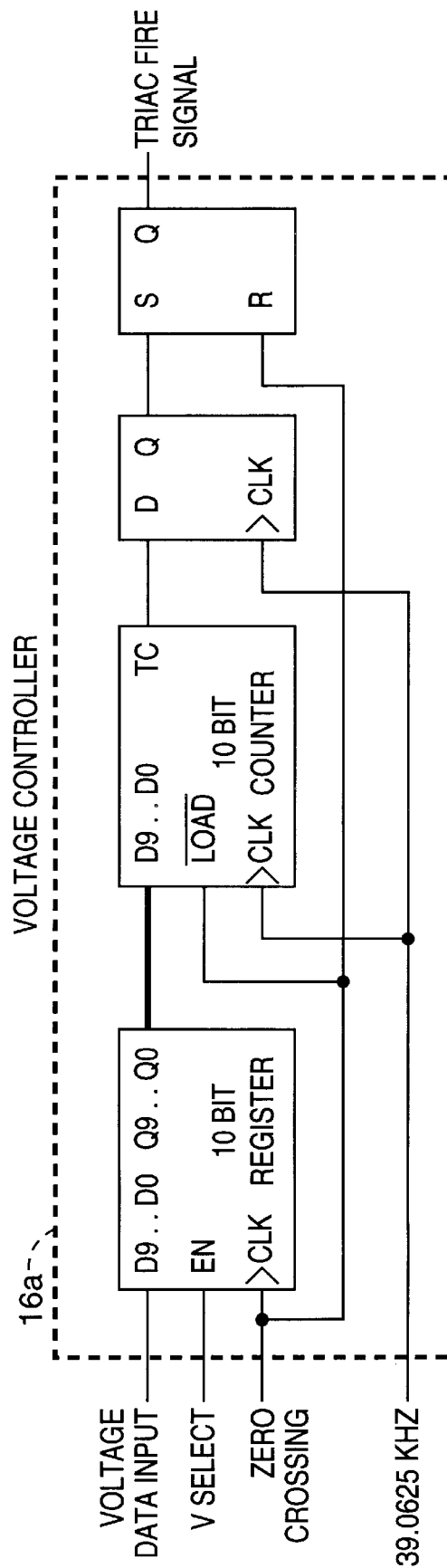
FIG. 13 is a functional block diagram of the voltage controller element of the digital motor controller shown in FIG. 12.
Figure 14:
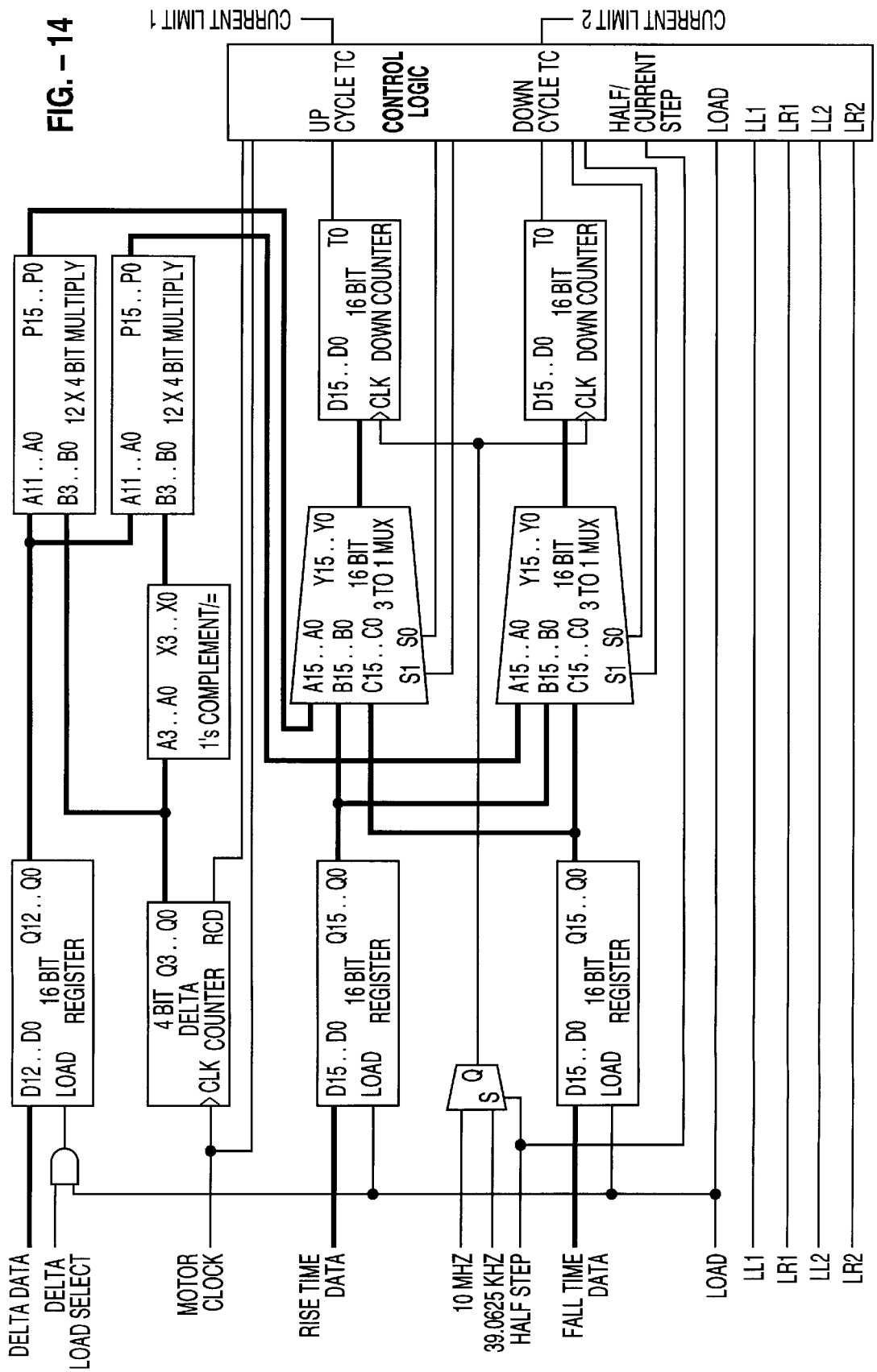
FIG. 14 is a functional block diagram of the current timer element of the digital motor controller shown in FIG. 12.
Figure 15:
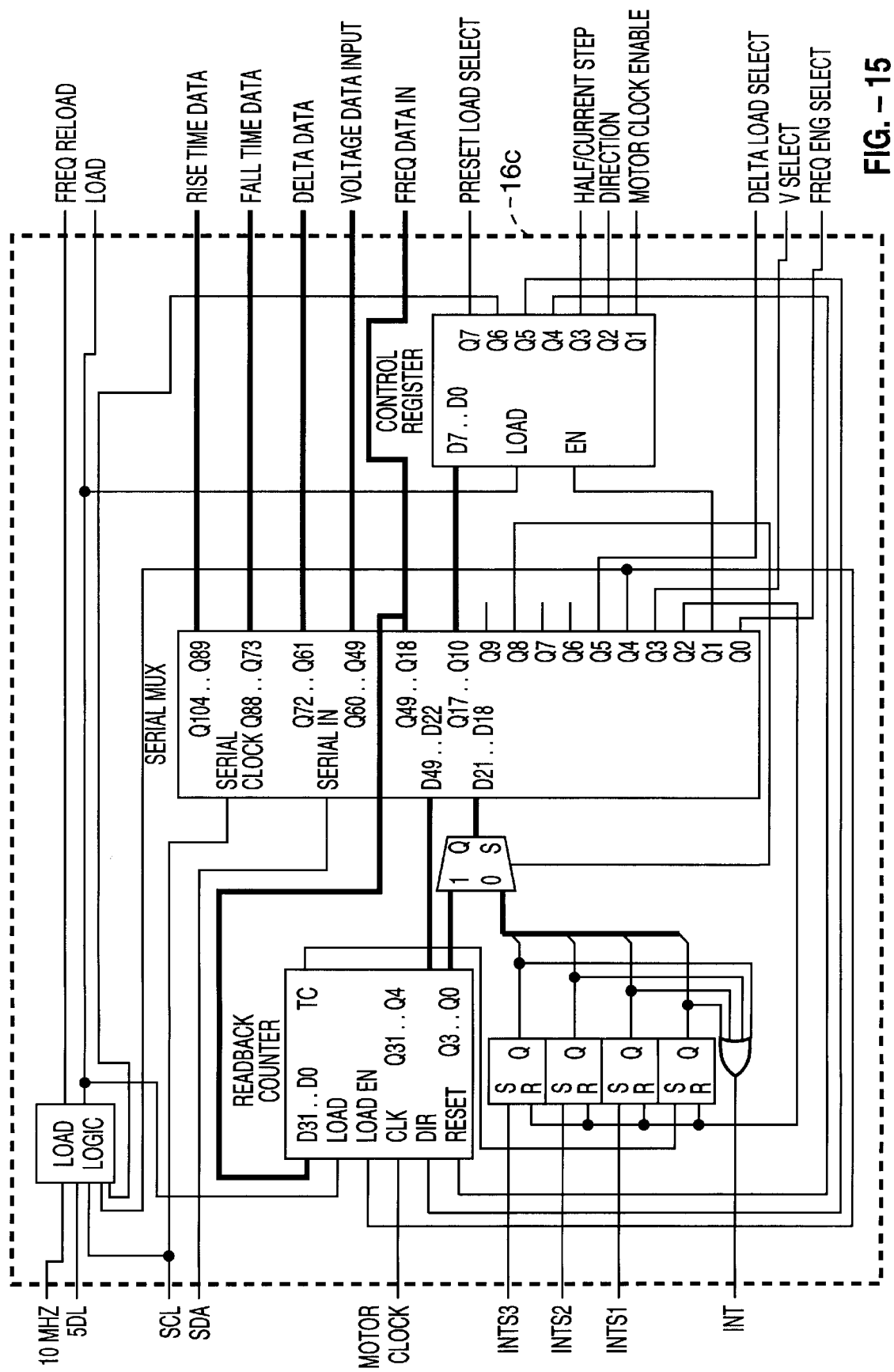
FIG. 15 is a functional block diagram of the serial multiplexer element of the digital motor controller shown in FIG. 12.
Figure 16:
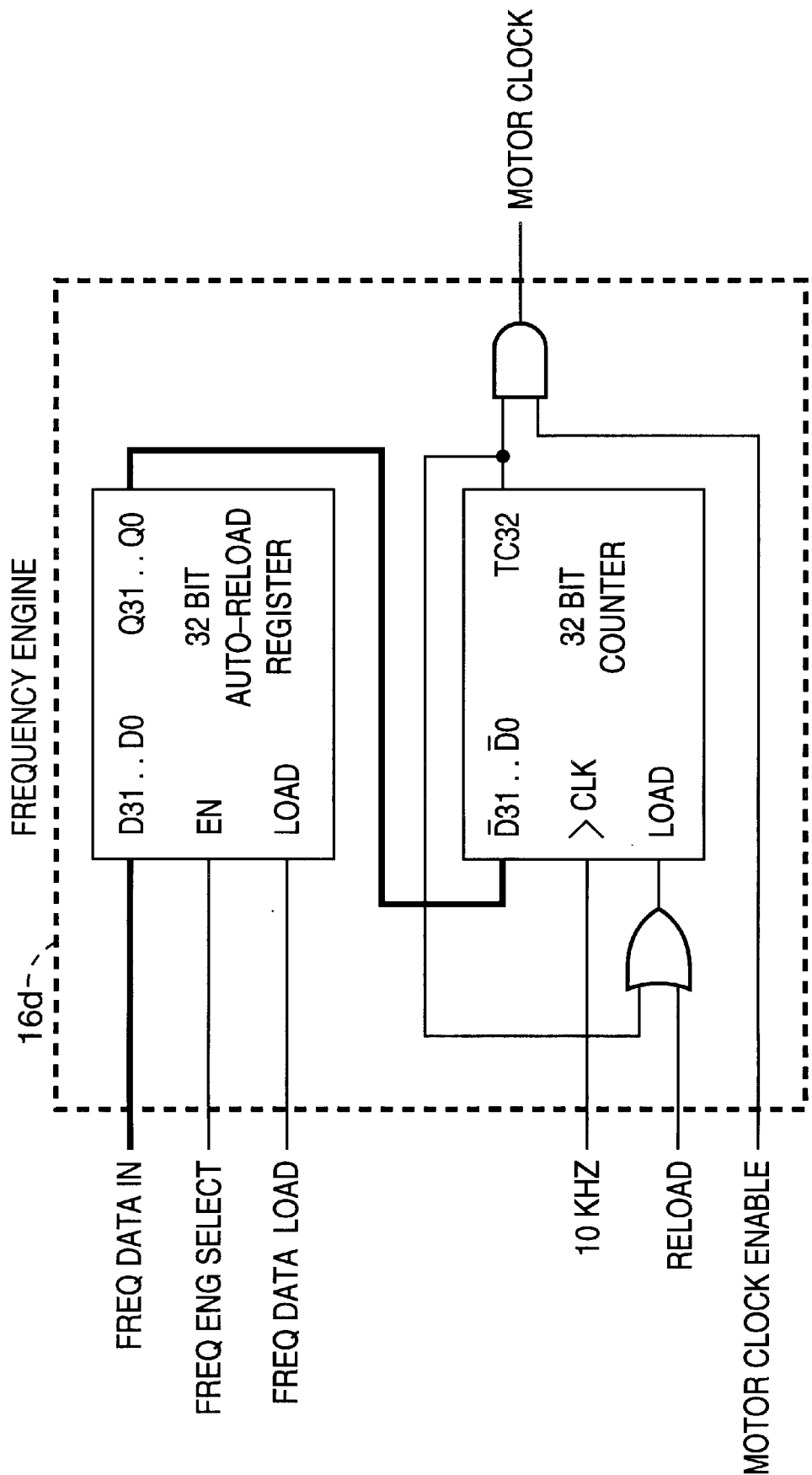
FIG. 16 is a functional block diagram of the frequency engine element of the digital motor controller shown in FIG. 12.

Referring more particularly to FIG. 13, an alternative to the self-contained digital voltage controller shown in FIG. 8 can be seen. This embodiment is a simpler configuration that is interfaced to a microprocessor. The microprocessor sets the voltage value by means of loading the auto-reload register for the down timer. The down counter is clocked by a 39.0625 Khz signal. The down counter is reloaded (reset) with the rising edge of the 120 Hz zero crossing signal. When the down counter is counting, the output of the counter is high. Between the time when the down counter reaches zero and the rising edge of the next zero crossing signal, the output is low. This output signal, which is in essence a pulse width signal synchronized with the AC line, is used as the triac fire control signal.

Although the description above contains many specificities, these should not be construed as limiting the scope of the invention but as merely providing illustrations of some of the presently preferred embodiments of this invention. Thus the scope of this invention should be determined by the appended claims and their legal equivalents.

What is claimed is:

1. A motor control apparatus for a direct current powered stepper motor of the type having a motor coil with first and second ends and a center tap, comprising:
   (a) a motor driver circuit having first, second, third, fourth and fifth power transistors,
   (b) said first and second power transistors having inputs for connection to a first output of a direct current power supply, said first power transistor having an output for connection to said first end of said motor coil, said second power transistor having an output for connection to said second end of said motor coil;
   (c) said third and fourth power transistors having outputs for connection to a common return output of said direct current power supply, said third power transistor having an input for connection to said first end of said motor coil, said fourth power transistor having an input for connection to said second end of said motor coil;
   (d) said fifth power transistor having an input for connection to said center tap of said motor coil, said fifth power transistor having an output for connection to said common return output of said direct current power supply, wherein a control signal applied to said fifth power transistor causes said center tap of said motor coil to be switched to said common return output of said direct current power supply.

2. An apparatus as recited in claim 1, wherein said first, second, third, and fourth power transistors function to energize and denergize said motor coil, and further comprising a control circuit coupled to said fifth power transistor for dissipating excess energy from said motor coil between denergization and energization of said motor coil.

3. An apparatus as recited in claim 1, further comprising a digital motor commutation circuit for generating full, half and microstep commutating signals to be applied to said motor driver circuit for energizing and de-energizing said motor coil.

4. An apparatus as recited in claim 3, further comprising a high side driver circuit connected to said first and second power transistors, said high side driver circuit being electrically isolated from said digital motor commutation signal circuit, said high side driver circuit being powered by said first output of said direct current power supply and an isolated return output such that power to said driver circuit floats at a fixed voltage below the voltage between said first output of said direct current power supply and said common return output, and wherein a motor commutation signal control voltage is applied to said first and second power transistors independent of the voltage between said first output and said common return output of said direct current power supply.

5. An apparatus as recited in claim 1, further comprising a variable voltage control circuit for varying the drive voltage to said motor as a function of speed, torque load, and electromechanical characteristics of said motor.

6. An apparatus as recited in claim 1, further comprising a window comparator for determining if the voltage applied across said motor coil is within a predetermined voltage window.

7. An apparatus as recited in claim 6, further comprising means for digitally adjusting voltage applied across said motor coil in response to motor speed and a voltage signal from said window comparator circuit.

8. An apparatus as recited in claim 1, further comprising means for digitally controlling current flow to said motor as a function of speed, torque load, and electromechanical characteristics of said motor.

9. A motor control apparatus for a direct current powered stepper motor of the type having a motor coil with first and second ends, comprising:
   (a) a motor driver circuit having first, second, third and fourth power transistors,
   (b) said first and second power transistors having inputs for connection to a first output of a direct current power supply, said first power transistor having an output for connection to said first end of said motor coil, said second power transistor having an output for connection to said second end of said motor coil;
   (c) said third and fourth power transistors having outputs for connection to a common return output of said direct current power supply, said third power transistor having an input for connection to said first end of said motor coil, said fourth power transistor having an input for connection to said second end of said motor coil;
   (d) a digital motor commutation circuit for generating full, half and microstep commutating signals to be applied to said motor driver circuit for energizing and de-energizing said motor coil; and (e) a high side driver circuit connected to said first and second power transistors, said high side driver circuit being electrically isolated from said digital motor commutation signal circuit, said high side driver circuit being powered by said first output of said direct current power supply and an isolated return output such that power to said driver circuit floats at a fixed voltage below the voltage between said first output of said direct current power supply and said common return output, and wherein a motor commutation signal control voltage is applied to said first and second power transistors independent of the voltage between said first output and said common return output of said direct current power supply.

10. An apparatus as recited in claim 9, wherein said motor coil includes a center tap and further comprising a fifth power transistor having an input for connection to said center tap of said motor coil, said fifth power transistor having an output for connection to said common return output of said direct current power supply, wherein a control signal applied to said fifth power transistor causes said center tap of said motor coil to be switched to said common return output of said direct current power supply.

11. An apparatus as recited in claim 10, wherein said first, second, third, and fourth power transistors function to energize and denergize said motor coil, and further comprising a control circuit coupled to said fifth power transistor for dissipating excess energy from said motor coil between denergization and energization of said motor coil.

12. An apparatus as recited in claim 9, further comprising a digital motor commutation circuit for generating full, half and microstep commutating signals to be applied to said motor driver circuit for energizing and de-energizing said motor coil.

13. An apparatus as recited in claim 9, further comprising a variable voltage control circuit for varying the drive voltage to said motor as a function of speed, torque load, and electromechanical characteristics of said motor.

14. An apparatus as recited in claim 9, further comprising a window comparator circuit for determining if the voltage applied across said motor coil is within a predetermined voltage window.

15. An apparatus as recited in claim 14, further comprising means for digitally adjusting voltage applied across said motor coil in response to motor speed and a voltage signal from said window comparator circuit.

16. An apparatus as recited in claim 9, further comprising means for digitally controlling current flow to said motor as a function of speed, torque load, and electromechanical characteristics of said motor.

17. A motor control apparatus for a direct current powered stepper motor of the type having a motor coil with first and second ends and a center tap, comprising:

(a) a motor driver circuit having first, second, third, fourth and fifth power transistors, (b) said first and second power transistors having inputs for connection to a first output of a direct current power supply, said first power transistor having an output for connection to said first end of said motor coil, said second power transistor having an output for connection to said second end of said motor coil;

(c) said third and fourth power transistors having outputs for connection to a common return output of said direct current power supply, said third power transistor having an input for connection to said first end of said motor coil, said fourth power transistor having an input for connection to said second end of said motor coil;

(d) said fifth power transistor having an input for connection to said center tap of said motor coil, said fifth power transistor having an output for connection to said common return output of said direct current power supply;

(e) wherein said first, second, third, and fourth power transistors function to energize and denergize said motor coil;

(f) a control circuit coupled to said fifth power transistor for dissipating excess energy from said motor coil between denergization and energization of said motor coil, wherein a control signal applied to said fifth power transistor causes said center tap of said motor coil to be switched to said common return output of said direct current power supply;

(g) a digital motor commutation circuit for generating full, half and microstep commutating signals to be applied to said motor driver circuit for energizing and de-energizing said motor coil; and (h) a high side driver circuit connected to said first and second power transistors, said high side driver circuit being electrically isolated from said digital motor commutation signal circuit, said high side driver circuit being powered by said first output of said direct current power supply and an isolated return output such that power to said driver circuit floats at a fixed voltage below the voltage between said first output of said direct current power supply and said common return output, and wherein a motor commutation signal control voltage is applied to said first and second power transistors independent of the voltage between said first output and said common return output of said direct current power supply.

18. An apparatus as recited in claim 17, further comprising a variable voltage control circuit for varying the drive voltage to said motor as a function of speed, torque load, and electromechanical characteristics of said motor.

19. An apparatus as recited in claim 17, further comprising a window comparator for determining if the voltage applied across said motor coil is within a predetermined voltage window.

20. An apparatus as recited in claim 19, further comprising means for digitally adjusting voltage applied across said motor coil in response to motor speed and a voltage signal from said window comparator circuit.

21. An apparatus as recited in claim 17, further comprising means for digitally controlling current flow to said motor as a function of speed, torque load, and electromechanical characteristics of said motor.

\* \* \* \* \*